(12) United States Patent
Ikushima et al.

(10) Patent No.: US 8,976,890 B2
(45) Date of Patent: Mar. 10, 2015

(54) MULTILEVEL AMPLITUDE MODULATION DEVICE, MULTILEVEL AMPLITUDE DEMODULATION DEVICE, TRANSMISSION SYSTEM INCLUDING THESE, MULTILEVEL AMPLITUDE MODULATION METHOD, AND MULTILEVEL AMPLITUDE DEMODULATION METHOD

(71) Applicant: Panasonic Corporation, Osaka (JP)

(72) Inventors: Tsuyoshi Ikushima, Nara (JP); Osamu Shibata, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 131 days.

(21) Appl. No.: 13/892,464

(22) Filed: May 13, 2013

(65) Prior Publication Data

US 2013/0251060 A1 Sep. 26, 2013

Related U.S. Application Data

(63) Continuation of application No. PCT/JP2012/006401, filed on Oct. 4, 2012.

(30) Foreign Application Priority Data

Oct. 26, 2011 (JP) ................................ 2011-234683

(51) Int. Cl.
*H04L 25/34* (2006.01)
*H04L 25/49* (2006.01)
*H04L 25/06* (2006.01)

(52) U.S. Cl.
CPC ........ *H04L 25/4917* (2013.01); *H04L 25/4919* (2013.01); *H04L 25/061* (2013.01)
USPC ........... 375/286; 375/264; 375/287; 398/130; 398/140; 341/58; 341/59; 341/60; 341/106

(58) Field of Classification Search
CPC ... H04L 25/4917; H04L 25/066; H04L 27/06; H04B 10/541
USPC .................. 398/130, 140; 375/264, 286, 287; 341/50, 58, 55, 59, 60, 61, 95, 97, 98, 341/102, 103, 106
See application file for complete search history.

(56) References Cited

U.S. PATENT DOCUMENTS 4,553,102 A * 11/1985 Yoshida ........................ 329/310
4,602,374 A * 7/1986 Nakamura et al. ............ 375/287

(Continued)

FOREIGN PATENT DOCUMENTS

| JP | 08-181723 A | 7/1996 |
|----|----|----|
| JP | 11-239115 A | 8/1999 |
| JP | 2001-298490 A | 10/2001 |
| JP | 2009-147413 A | 7/2009 |
| JP | 2010-021629 A | 1/2010 |
| JP | 2010-213263 A | 9/2010 |

OTHER PUBLICATIONS

Widmer, A.X.; Franaszek, P.A., "A DC-Balanced, Partitioned-Block, 8B/10B Transmission Code," IBM Journal of Research and Development, vol. 27, No. 5, pp. 440,451, Sep. 1983.*

(Continued)

*Primary Examiner* — Daniel Washburn
*Assistant Examiner* — Amneet Singh
(74) *Attorney, Agent, or Firm* — Renner, Otto, Boisselle & Sklar, LLP

(57) ABSTRACT

A multilevel amplitude modulation device for generating, from digital data, a multilevel amplitude modulation signal having four or more signal levels and outputting the generated signal, including: an average level calculator that selects one of a plurality of preliminarily prepared different candidates for a code word building method such that average level of a symbol array, obtained by adding a symbol for a code word of digital data to be transmitted to one or more already outputted symbols included in a multilevel amplitude modulation signal already outputted, is most approximate to voltage center of the four or more signal levels, and outputs a selection signal indicating the selected method; a signal converter that forms a codeword of the digital data in accordance with the method indicated by the selection signal; and a multilevel modulator that generates a multilevel amplitude modulation signal using the codeword and outputs the generated signal.

11 Claims, 23 Drawing Sheets

(56) References Cited

U.S. PATENT DOCUMENTS

| | | | |
|---|---|---|---|
| 5,825,828 A * | 10/1998 | Sasaki | 375/298 |
| 6,198,413 B1 * | 3/2001 | Widmer | 341/59 |
| 6,449,245 B1 | 9/2002 | Ikeda et al. | |
| 6,587,512 B1 * | 7/2003 | Reuven et al. | 375/296 |
| 6,614,369 B1 * | 9/2003 | Widmer | 341/59 |
| 2003/0108092 A1 * | 6/2003 | Gorecki et al. | 375/219 |
| 2003/0152154 A1 * | 8/2003 | Johnson | 375/259 |
| 2003/0194016 A1 * | 10/2003 | Gorecki et al. | 375/268 |
| 2004/0109509 A1 * | 6/2004 | Stonecypher et al. | 375/286 |
| 2004/0114692 A1 * | 6/2004 | Matsumoto | 375/264 |
| 2004/0208257 A1 * | 10/2004 | Bessios et al. | 375/286 |
| 2004/0228364 A1 * | 11/2004 | Walker et al. | 370/470 |
| 2004/0240580 A1 * | 12/2004 | Bessios et al. | 375/288 |
| 2006/0126751 A1 * | 6/2006 | Bessios | 375/264 |
| 2006/0139186 A1 * | 6/2006 | Hoyer | 341/50 |
| 2008/0180287 A1 * | 7/2008 | Widmer | 341/95 |
| 2008/0273614 A1 * | 11/2008 | Heegard et al. | 375/260 |
| 2010/0202555 A1 * | 8/2010 | Takahashi et al. | 375/292 |

OTHER PUBLICATIONS

International Search Report for corresponding International Application No. PCT/JP2012/006401 mailed Dec. 25, 2012.

International Preliminary Report on Patentability for corresponding International Application No. PCT/JP2012/006401 mailed May 8, 2014 (English translation).

* cited by examiner

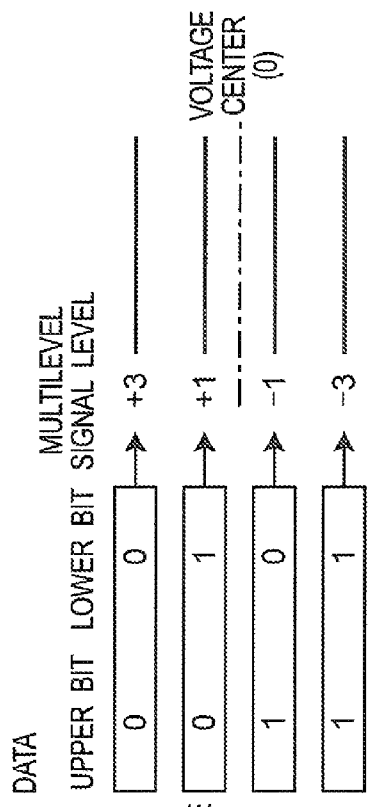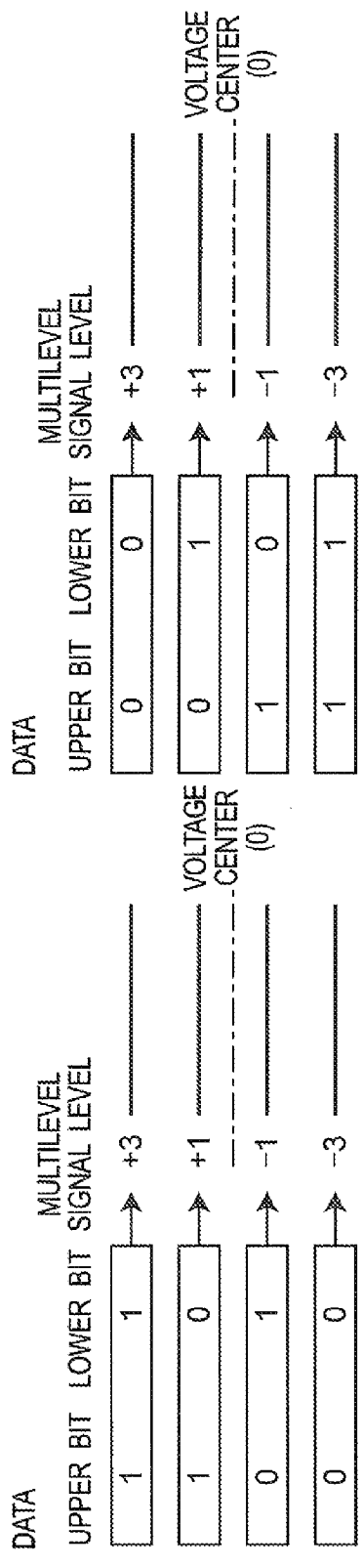

381
HEADER
(2 SYMBOLS)
↓
ALWAYS FORMED
BY USING
ARRANGEMENT 1

383
PAYLOAD
(64 SYMBOLS)
↓
SELECTED FROM
ARRANGEMENTS 1 AND 2

(a) CASE WHERE
ARRANGEMENT 1 IS
USED IN PAYLOAD

381a (b) CASE WHERE ARRANGEMENT
2 IS USED IN PAYLOAD

| AVERAGE SIGNAL LEVEL OF CODE WORDS ALREADY TRANSMITTED | | | | AVERAGE SIGNAL LEVEL OF A CODE WORD TO BE TRANSMITTED SUBSEQUENTLY | | | AVERAGE SIGNAL LEVEL OF FIVE CODE WORDS |
|---|---|---|---|---|---|---|---|
| 1 | 2 | 3 | 4 | | HEADER | PAYLOAD | OVERALL CODE WORD | |
| 0.5 | −0.2 | 0.3 | −0.1 | CASE OF METHOD (a) (ARRANGEMENT 1) | −2 | 0.1 | 0.04 | 0.11 |
| | | | | CASE OF METHOD (b) (ARRANGEMENT 2) | 2 | −0.1 | −0.04 | 0.09 ← SELECTED |

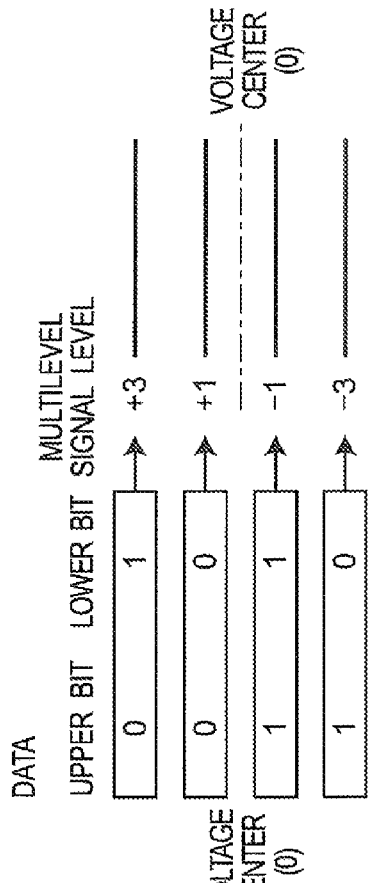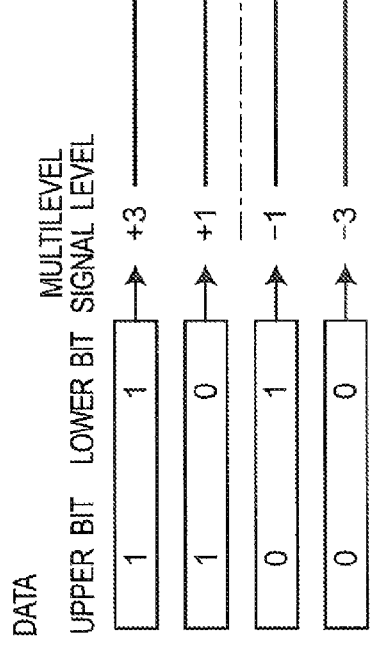

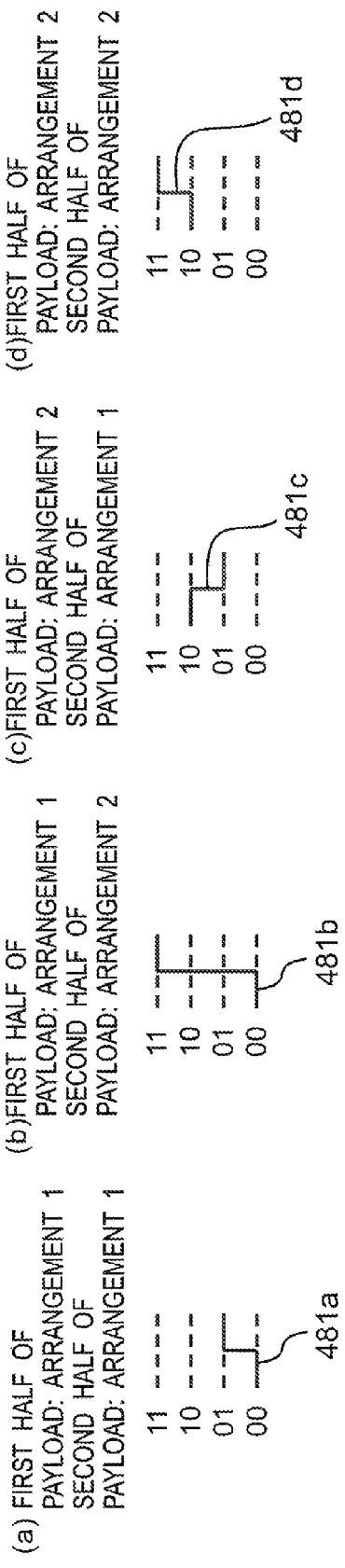

Fig.21A (a)

| | AVERAGE SIGNAL LEVEL OF CODE WORDS ALREADY TRANSMITTED | | | |
|---|---|---|---|---|
| | 1 | 2 | 3 | 4 |
| | 0.5 | -0.2 | 0.3 | -0.1 |

Fig.21B (b)

| METHOD | SIGNAL LEVEL ARRANGEMENT PATTERN IN PAYLOAD | | CODE WORD TO BE TRANSMITTED SUBSEQUENTLY | | | | AVERAGE SIGNAL LEVEL OF FIVE CODE WORDS |
|---|---|---|---|---|---|---|---|
| | FIRST HALF | SECOND HALF | HEADER | AVERAGE SIGNAL LEVEL | | | |
| | | | | FIRST HALF OF PAYLOAD | SECOND HALF OF PAYLOAD | OVERALL CODE WORD | |
| (a) | ARRANGEMENT 1 | ARRANGEMENT 1 | -2 | 0.1 | 0.2 | 0.04 | 0.11 |
| (b) | ARRANGEMENT 1 | ARRANGEMENT 2 | 0 | 0.1 | -0.2 | 0.10 | 0.12 |
| (c) | ARRANGEMENT 2 | ARRANGEMENT 1 | 0 | -0.1 | 0.2 | -0.10 | 0.08 | ←SELECTED
| (d) | ARRANGEMENT 2 | ARRANGEMENT 2 | 2 | -0.1 | -0.2 | -0.04 | 0.09 |

Fig. 23 (PRIOR DATA)

MULTILEVEL AMPLITUDE MODULATION DEVICE, MULTILEVEL AMPLITUDE DEMODULATION DEVICE, TRANSMISSION SYSTEM INCLUDING THESE, MULTILEVEL AMPLITUDE MODULATION METHOD, AND MULTILEVEL AMPLITUDE DEMODULATION METHOD

CROSS-REFERENCE TO RELATED APPLICATIONS

This is a continuation application of International Application No. PCT/JP2012/006401, with an international filing date of Oct. 4, 2012, which claims priority of Japanese Patent Application No. 2011-234683 filed on Oct. 26, 2011, the content of which is incorporated herein by reference.

BACKGROUND

1. Technical Field

The technical field relates to modulation and demodulation of data, particularly to modulation and demodulation of data using a multilevel amplitude modulation scheme for transmitting information of a plurality of bits with one symbol.

2. Related Art

Signal processing in audio-visual devices such as televisions and recorders has been increasing in speed year after year, and transmission speed required for data transmission between these devices has been also increasing year by year. The necessity for efficient transmission of a large amount of data with limited bands of transmission lines has been increasing accordingly.

There is a multilevel transmission scheme as one of the methods of transmitting a larger amount of data on the limited bands of transmission lines. A multilevel amplitude modulation scheme as one type of the multilevel transmission scheme employs four or more amplitude levels (voltage levels) to a symbol forming a transmission signal. Such a multilevel amplitude modulation scheme enables transmission of information of a plurality of bits with one symbol. For example, in four-level amplitude modulation, information of two bits corresponds to four voltage levels. The four-level amplitude modulation thus realizes data transmission speed twice as fast as that of two-level transmission in a same bandwidth.

Employment of encoding schemes of small overhead is another measure for realizing higher efficiency in data transmission. The 64B66B encoding scheme disclosed in Patent Literature 1 (PTL1: JP 2001-298490 A) is one example of such encoding schemes of small overhead. The encoding scheme according to PTL1 (JP 2001-298490 A) uses a code word including a header of two bits and a payload of 64 bits. The header according to the 64B66B encoding scheme has a pattern including level transition ("01" or "10"), and a receiving device synchronizes the code word and detects the type of data with use of the header. The payload according to the 64B66B encoding scheme stores scrambled transmission data. Such scrambling is executed in order to secure DC balance and reduce EMI by flattening a signal spectrum.

The overhead according to the 64B66B encoding scheme is 3.125%. On the other hand, the 8B10B encoding scheme, which is generally used, has overhead of 25%. The overhead according to the 64B66B encoding scheme is much smaller than that of the 8B10B encoding scheme. In view of the above, the 64B66B encoding scheme is useful for more efficient data transmission.

FIG. 22 is a block diagram showing an example of a configuration of a transmitter including a modulation unit that employs the four-level amplitude modulation scheme and the 64B66B encoding scheme. FIG. 23 is a block diagram showing an example of a configuration of a receiver including a demodulation unit corresponding to the modulation unit shown in FIG. 22.

Referring to FIG. 22, a transmitter 900T includes dual encoding mechanisms (911a to 915a and 911b to 915b) in order to transmit data of two bits with one symbol.

Transmission data 931 of 128 bits is initially halved into two pieces of data of 64 bits, which are received by two scramblers 911a and 911b to be scrambled. The pieces of data scrambled by the scramblers 911a and 911b are received by parallel/serial converters 915a and 915b as transmission scrambled data 933a and 933b. The parallel/serial converters 915a and 915b also receive header bits 935a and 935b of two bits generated by header generators 913a and 913b. The header generators 913a and 913b generate the header bits 935a and 935b so as to correspond to the type of the transmission data (whether ordinary data or a control signal). The parallel/serial converters 915a and 915b converts the two pieces of transmission scrambled data 933a and 933b of 64 bits as well as the header bits 935a and 935b of two bits thus received into serial signals, and outputs a modulation input signal 937a (upper bits) and a modulation input signal 937b (lower bits). In accordance with the arrangement shown in FIG. 24 or the like, a multilevel modulator 917 obtains multiple signal levels corresponding to data of two bits obtained from the modulation input signal 937a as an upper bit and the modulation input signal 937b as a lower bit, and outputs a signal having amplitude (voltage) of the levels thus obtained as a multilevel amplitude modulation transmission signal 939.

Described next with reference to FIG. 23 is operation of the receiver that demodulates a modulation signal. A multilevel demodulator 957 in a receiver 900R receives a reception signal 979 (the transmission signal 939 obtained by multilevel amplitude modulation in FIG. 22). In accordance with the arrangement shown in FIG. 24 or the like, the multilevel demodulator 957 demodulates the reception signal 979 and outputs a (upper bit) demodulation output signal 977a and a (lower bit) demodulation output signal 977b. Serial/parallel converters 955a and 955b convert the demodulation output signals 977a and 977b into parallel signals and output a (upper bit) reception parallel signal 975a and a (lower bit) reception parallel signal 975b, respectively. A parallel signal synchronizer 953 initially detects headers in the reception parallel signals 975a and 975b, demodulates the order of bits on the basis of the detected headers, and outputs reception scrambled data 973a and 973b. Descramblers 951a and 951b descramble the reception scrambled data 973a and 973b and output reception data 971.

SUMMARY OF INVENTION

In the conventional configuration exemplified in FIG. 22, it has been thought that the DC balance of the transmission signal 939 can be secured by the workings of the scramblers 911a and 911b, which makes the probabilities of a bit "1" and a bit "0" in the pieces of transmission scrambled data 933a and 933b equal.

The probability of a bit "1" and the probability of a bit "0" in each of the pieces of transmission scrambled data 933a and 933b outputted from the scramblers 911a and 911b can be regarded as being equal on a relatively long-term basis. However, the probability of a bit "1" and the probability of a bit "0"

are not necessarily equal to each other on a short-term basis. Generally, profitable DC balance is not necessarily secured in the transmission signal 939.

Furthermore, in the conventional configuration exemplified in FIG. 22, a multilevel signal is generated by combining pieces of data outputted from two or more scramblers that operate independently from one another. Even if each of the pieces of data outputted from the scramblers has a probability of a bit "1" equal to a probability of a bit "0", it is impossible to generally ensure equal probabilities of any signal levels in a multilevel signal sequence outputted from the multilevel modulator 917. The conventional configuration exemplified in FIG. 22 thus fails to generally ensure profitable DC balance.

As described above, simple combination of the multilevel amplitude modulation and the 64B66B encoding scheme does not achieve secured DC balance in the transmission signal 939 but causes fluctuation in signal level thereof. As a result, the receiver 900R could not correctly receive and demodulate a transmission signal in some cases.

The aspects of the present invention has been made in view of the above problems of the conventional art. They provide a modulation device and a demodulation device according to a multilevel amplitude modulation scheme for efficient and stable data transmission, and a transmission system including these devices, as well as a multilevel amplitude modulation method and a multilevel amplitude demodulation method.

According to the first aspect, there is provided a multilevel amplitude modulation device for generating, from digital data, a multilevel amplitude modulation signal having four or more signal levels and outputting the generated signal, the modulation device including: an average level calculator operable to select one of a plurality of preliminarily prepared different candidates for a code word building method such that an average signal level of a symbol array, obtained by adding a symbol for a code word of digital data to be transmitted to one or more already outputted symbols included in a multilevel amplitude modulation signal already outputted, is most approximate to voltage center of the four or more signal levels, and output a selection signal indicating the selected code word building method; a signal converter operable to form a code word of the digital data in accordance with the code word building method indicated by the selection signal; and a multilevel modulator operable to generate a multilevel amplitude modulation signal with use of the code word and output the generated multilevel amplitude modulation signal.

According to the second aspect, there is provided a multilevel amplitude demodulation device for demodulating a multilevel amplitude modulation signal having four or more signal levels and outputting digital data, the demodulation device including: a synchronizer operable to demodulate the multilevel amplitude modulation signal and detect a header of a code word; a signal inverter operable to identify a code word building method employed to form the code word based on a value of the header detected by the synchronizer and executing inverse conversion corresponding to the code word building method to generate and output digital data.

According to the third aspect, there is provided a transmission system that includes a transmitter having the multilevel amplitude modulation device of the first aspect and a receiver having the multilevel amplitude demodulation device of the second aspect.

These general and specific aspects can be realized by a system, a method, a computer program, or combination of any of the system, the method, and the computer program.

In the multilevel amplitude modulation device according to one of the aspects effectively suppresses deviation in signal level of a multilevel amplitude modulation signal, secures profitable DC balance, and realizes highly efficient and stable data transmission.

BRIEF DESCRIPTION OF DRAWINGS

FIGS. 13A and 13B are diagrams each showing an example of data arrangement in a multilevel signal used in the third embodiment;

FIG. 16 is a chart showing examples of determination of a code word building method based on an average signal level of symbols for most recent code words of a predetermined number;

FIGS. 17A and 17B are diagrams each showing a different example of data arrangement in a multilevel signal used in the third embodiment;

FIGS. 20A to 20D are diagrams each showing an example of a header used in the fourth embodiment;

FIGS. 21A and 21B are charts showing examples of determination of a code word building method based on an average signal level of symbols for most recent code words of a predetermined number;

DETAILED DESCRIPTION

1. Outline

Figure 1:
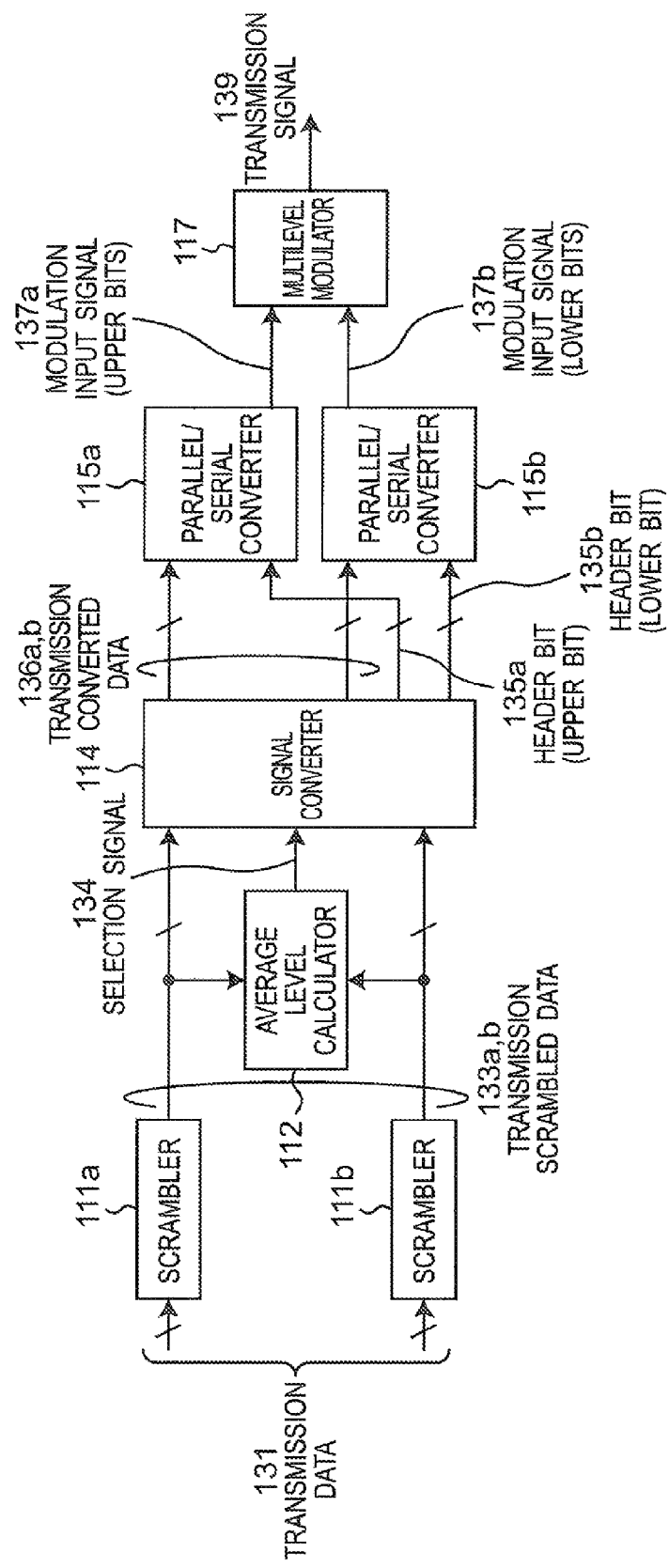
FIG. 1 is a block diagram of a configuration of a transmitter according to a first embodiment.

Described in each of the following embodiments is a transmission system according to a multilevel amplitude modulation scheme. The transmission system according to each of the embodiments includes a transmitter including a modulation device and a receiver including a demodulation device. The modulation device and the demodulation device according to each of the embodiments execute data transmission by modulating data or demodulating a modulation signal in accordance with a multilevel amplitude modulation method of each of the embodiments to be described later.

In the multilevel amplitude modulation method according to each of the embodiments, a code word building method for data to be transmitted is selected from a plurality of candidates for a code word building method preliminarily prepared, on the basis of a signal level of one or more symbols included in a signal (modulation signal) having been transmitted. In this method, a code word building method is selected such that an average value of signal levels among one or more symbols having been transmitted and a symbol for a code word indicating data to be transmitted is more approximate to voltage center of multiple signal levels. Alternatively, a code word building method is selected such that an accumulated value of differences between voltage center and symbols having been transmitted and a symbol for a code word indicating data to be transmitted is more approximate to zero. Such a "symbol having been transmitted" may correspond to all symbols having been transmitted from the start of signal transmission in a transmission system, or, alternatively, may correspond to most recent symbol(s) of a predetermined number. Such a predetermined number can be appropriately determined on the basis of a lower cutoff frequency of a transmission line used for signal transmission.

In the multilevel amplitude modulation method according to each of the embodiments, deviation in signal level of a modulation signal is thus effectively suppressed to secure profitable DC balance.

The modulation device in the transmission system according to each of the embodiments can be realized by a program for executing the multilevel amplitude modulation method according to the corresponding embodiment and a processor for executing the program. Similarly, the demodulation device in the transmission system can be realized by a program for executing a multilevel amplitude demodulation method corresponding to the multilevel amplitude modulation method according to the corresponding embodiment and a processor for executing the program.

More specifically, according to one of the embodiments, there is provided a multilevel amplitude modulation device for generating, from digital data, a multilevel amplitude modulation signal having four or more signal levels and outputting the generated signal. The modulation device includes: an average level calculator operable to select one of a plurality of preliminarily prepared different candidates for a code word building method such that an average signal level of a symbol array, obtained by adding a symbol for a code word of digital data to be transmitted to one or more already outputted symbols included in a multilevel amplitude modulation signal already outputted, is most approximate to voltage center of the four or more signal levels, and output a selection signal indicating the selected code word building method; a signal converter operable to form a code word of the digital data in accordance with the code word building method indicated by the selection signal; and a multilevel modulator operable to generate a multilevel amplitude modulation signal with use of the code word and output the generated multilevel amplitude modulation signal.

According to one of the embodiments, there is provided a multilevel amplitude demodulation device for demodulating a multilevel amplitude modulation signal having four or more signal levels and outputting digital data. The demodulation device includes: a synchronizer operable to demodulate the multilevel amplitude modulation signal and detect a header of a code word; a signal inverter operable to identify a code word building method employed to form the code word based on a value of the header detected by the synchronizer and execute inverse conversion corresponding to the code word building method to generate and output digital data.

A transmission system according to one of the embodiments includes a transmitter including the multilevel amplitude modulation device and a receiver including the multilevel amplitude demodulation device.

According to one of the embodiments, there is provided a multilevel amplitude modulation method executed by a modulation device, of generating, from digital data, a multilevel amplitude modulation signal having four or more signal levels and outputting the generated signal. The multilevel amplitude modulation method includes: receiving digital data to be transmitted; selecting one of a plurality of preliminarily prepared different candidates for a code word building method such that an average signal level of a symbol array, obtained by adding a symbol for a code word of the digital data to one or more already outputted symbols included in a multilevel amplitude modulation signal already outputted, is most approximate to voltage center of the four or more signal levels, and generating a multilevel amplitude modulation signal with use of the code word of the data formed in accordance with the code word building method thus selected, and outputting the generated signal.

According to one of the embodiments, there is provided a multilevel amplitude demodulation method executed by a demodulation device, of demodulating a multilevel amplitude modulation signal having four or more signal levels and outputting digital data. The method includes: receiving a multilevel amplitude modulation signal; demodulating the multilevel amplitude modulation signal and detecting a header of a code word; identifying a code word building method employed to form the code word based on a value of the header; and executing, on the code word, inverse conversion corresponding to the code word building method thus identified.

Hereinafter, the number of multiple values of a transmission signal is set to four (two bits are transmitted with one symbol), and transmission data width is set to 128 bits (64 bits×2). It is noted that the number of multiple values and the transmission data width are merely exemplified and can be altered by other values.

A header in each code word is defined as including two symbols, although the number of symbols included in a header is not limited to two.

2. First Embodiment

2-1. Transmitter

A modulation unit (multilevel amplitude modulation device; hereinafter, abbreviated as "transmitter" unless otherwise misunderstood particularly) included in a transmitter according to the first embodiment receives data of 128 bits, encodes this data into 64 symbols of 4 multiple values, adds a header including two symbols to form a code word of 66 symbols, and outputs a modulation signal of this code word. The transmitter according to the present embodiment has a plurality of methods (candidates for a code word building method) of forming a code word of symbols from data of 128 bits, selects a code word building method from the candidates on the basis of a predetermined condition, and forms a code word of data of 128 bits in accordance with the selected formation method.

The transmitter selects the code word building method to be used for decoding data from among the plurality of candidates for a code word building method on the basis of a condition A or B to be described below. The transmitter has only to satisfy either one of the conditions A and B. One of the conditions to be satisfied can be determined prior to data transmission.

Condition A: select a code word building method for data to be subsequently transmitted such that an average value of signal levels of a predetermined number of (most recent) symbols recently transmitted from among symbols included in an already transmitted code word group and signal levels of symbols for a code word formed by encoding the data to be transmitted in accordance with the candidate for a code word building method is more approximate to voltage center in comparison to an average value obtained by encoding in accordance with any other candidate for a code word building method.

Condition B: select a code word building method for data to be subsequently transmitted such that an accumulated value of differences between the voltage center and signal levels of all the symbols having been transmitted from the start of transmission and differences between the voltage center and signal levels of symbols for a code word formed by encoding the data to be transmitted in accordance with the candidate for a code word building method is more approximate to zero in comparison to an accumulated value obtained by encoding in accordance with any other candidate for a code word building method.

The transmitter according to the present embodiment forms a code word for data to be transmitted in accordance with the code word building method thus selected on the basis of the condition A or B, and outputs a modulation signal of the code word, so as to reduce deviation in signal level of the modulation signal and secure desired DC balance.

2-1-1. Configuration

FIG. 1 is a block diagram showing a configuration of a transmitter 100T according to the first embodiment. This figure mainly depicts a configuration of the modulation unit included in the transmitter 100T. The configuration of portions other than the modulation unit in the transmitter 100T is not depicted where appropriate in order to simplify the figure.

The transmitter 100T according to the first embodiment includes scramblers 111a and 111b, an average level calculator 112, a signal converter 114, parallel/serial converters 115a and 115b, and a multilevel modulator 117.

The scramblers 111a and 111b receive 64 bits in data of 128 bits to be transmitted (transmission data 131), scramble data of 64 bits thus received, and output the scrambled data as transmission scrambled data 133a and 133b, respectively.

The average level calculator 112 calculates an average signal level of symbols included in a code word (including a header and a payload) formed by encoding the transmission scrambled data 133a and 133b in accordance with each candidate for a code word building method, selects, on the basis of the obtained average signal levels, a candidate for a code word building method to be employed for encoding the transmission scrambled data 133a and 133b, and outputs a selection signal 134 indicating the selected candidate for a code word building method.

The signal converter 114 converts the transmission scrambled data 133a and 133b on the basis of the selection signal 134 in accordance with the selected code word building method, and outputs as transmission converted data 136a and 136b. The signal converter 114 also generates a header of the code word in accordance with the selected code word building method and outputs as header bits 135a and 135b. Such "conversion" made by the signal converter 114 in accordance with the selected code word building method can include simply outputting the transmission scrambled data 133a and 133b as the transmission converted data 136a and 136b (no conversion). Even in such a case, the signal converter 114 generates a header of the code word in accordance with the selected code word building method and outputs as the header bits 135a and 135b. The signal converter 114 is capable of forming the header bits 135a and 135b so as to include information as to which one of the code word building methods has been selected as a method of encoding transmission data. The signal converter 114 is capable of partially or entirely forming contents of the header bits 135a and 135b in accordance with the selected code word building method. A device to receive a modulation signal is capable of easily finding which one of the code word building methods has been employed to encode transmission data by analyzing a header of the modulation signal.

The parallel/serial converter 115a receives the header bit 135a and the transmission converted data 136a corresponding to the upper 64 bits of the transmission data 131 to execute parallel/serial conversion, and outputs a serial signal (modulation input signal 137a).

The parallel/serial converter 115b receives the header bit 135b and the transmission converted data 136b corresponding to the lower 64 bits of the transmission data 131 to execute parallel/serial conversion, and outputs a serial signal (modulation input signal 137b).

The multilevel modulator 117 receives the modulation input signals 137a and 137b to execute multilevel amplitude modulation with use of these signals, and outputs a multilevel amplitude modulation signal (transmission signal 139). The multilevel modulator 117 can be realized by a circuit for providing, for example, to the modulation input signal 137a (corresponding to the upper bits), amplitude twice as large as that of the modulation input signal 137b (corresponding the lower bits) and then adding these two.

It is noted that the scramblers 111a and 111b are not essential components for the transmitter 100T. The scramblers 111a and 111b can be excluded if the transmission data 131 includes "0" bits and "1" bits sufficiently at random.

2-1-2. Operation

Operation of the transmitter 100T is described below with reference to FIGS. 2 to 5.

Figure 2:
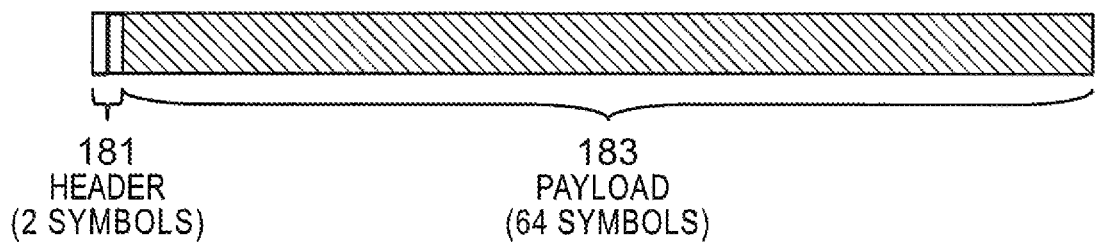
FIG. 2 is a schematic diagram of a configuration of a code word in the first embodiment.

FIG. 2 schematically depicts a code word included in the transmission signal 139 to be outputted from the transmitter 100T. The code word includes a header 181 of 2 symbols, and a payload 183 of 64 symbols. The number of symbols in the header 181, the number of symbols in the payload 183, and combination of these are not limited to the case exemplified above.

Figure 3:
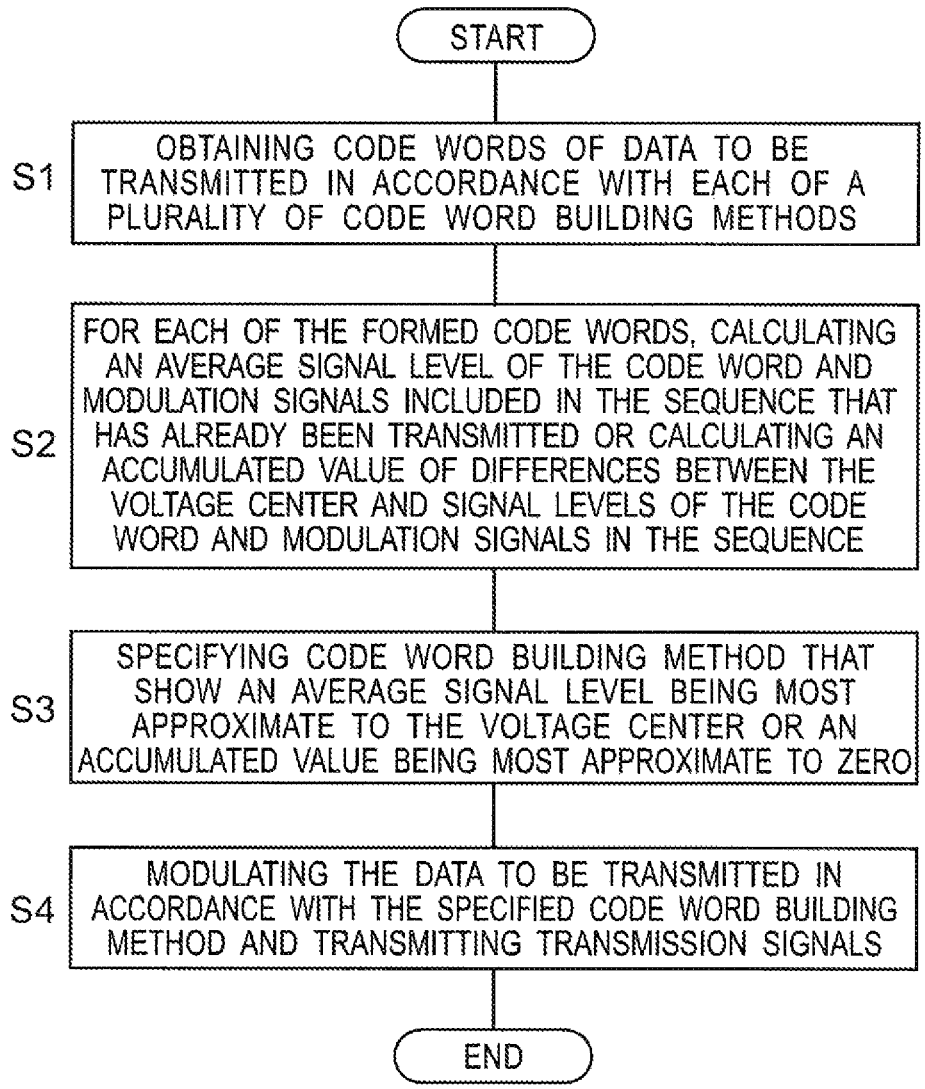
FIG. 3 is a flowchart of processing of the transmitter.
Figure 4:
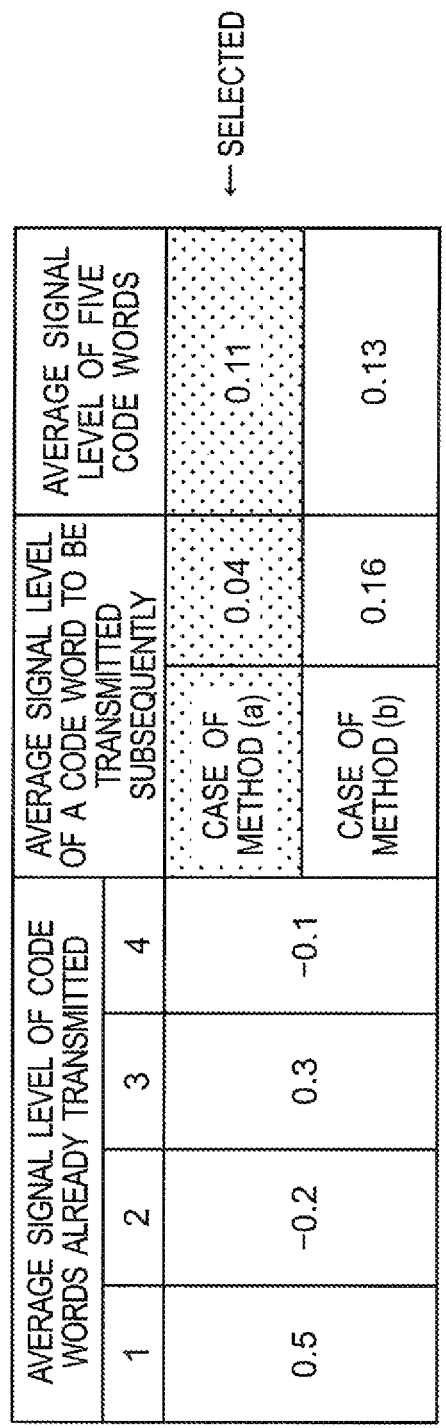
FIG. 4 is a chart showing examples of determination of a code word building method based on an average signal level of symbols for most recent code words of a predetermined number.
Figure 5:
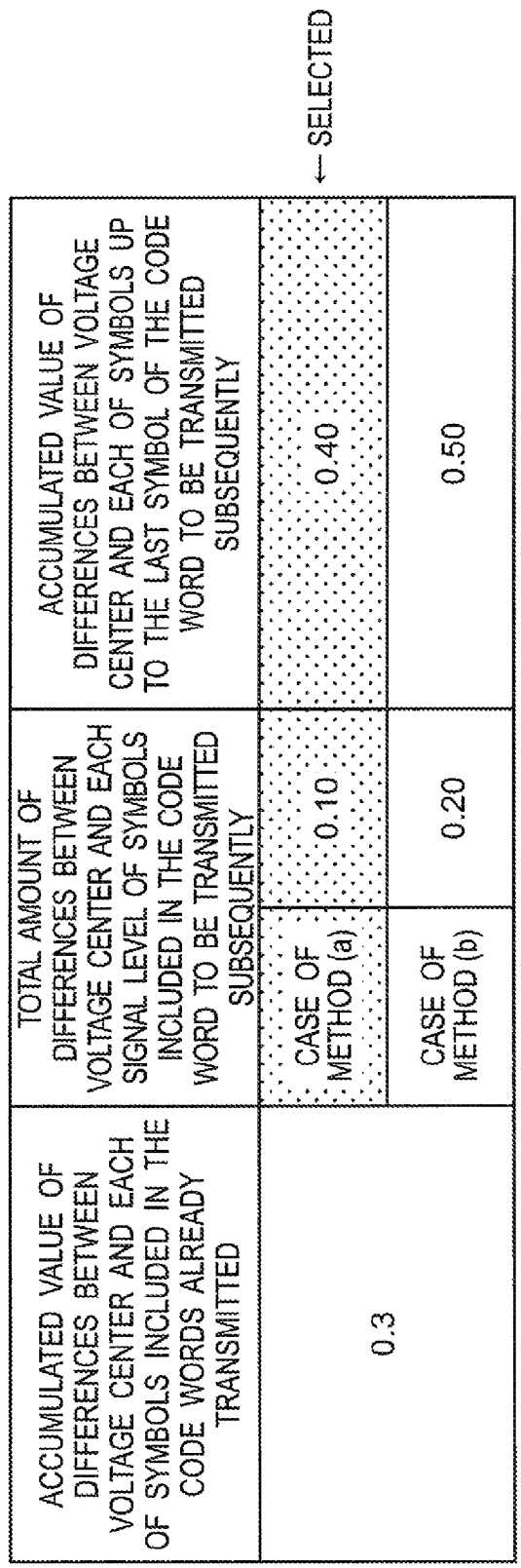
FIG. 5 is a chart showing examples of determination of a code word building method based on an accumulated value of differences each between a signal level of a symbol for a code word and voltage center.

FIG. 3 is a flowchart showing processing of the transmitter 100T. Described with reference to FIGS. 3 to 5 is how the transmitter 100T selects a code word building method, generates a transmission signal in accordance with the selected code word building method, and outputs the generated transmission signal.

The average level calculator 112 in the transmitter 100T receives the transmission scrambled data 133a and 133b of the data to be transmitted, and converts these pieces of data into code words in accordance with each of the plurality of candidates for a code word building method (S1). There are thus obtained a plurality of code words formed in accordance with the plurality of code word building methods different from one another.

Assume a case of selecting a code word building method on the basis of the condition A (select a code word building method for data to be subsequently transmitted such that an average value of a predetermined number of most recent symbols having been transmitted and symbols for a code word of the data to be transmitted is more approximate to a voltage center). In this case, the average level calculator 112 calculates an average value of signal levels of symbols included in each of the code words thus formed and signal levels of symbols included in the modulation signal (transmission signal 139) sequence having been transmitted. Assume another case of selecting a code word building method on the basis of the condition B (select a code word building method for data to be subsequently transmitted such that an accumulated value of differences between voltage center and signal levels of symbols having been transmitted and differences between the voltage center and signal levels of symbols for a code word of the data to be transmitted is more approximate to zero). In this case, the average level calculator 112 calculates an accumulated value of differences between the voltage center and symbols included in each of the code words thus formed and differences between the voltage center and the symbols included in the modulation signal (transmission signal 139) sequence having been transmitted (S2).

In the case of selecting a code word building method on the basis of the condition A, the average level calculator 112 selects one of the plurality of candidates for a code word building method such that the obtained average value (average signal level) is most approximate to the voltage center. In the other case of selecting a code word building method on the basis of the condition B, the average level calculator 112 selects one of the plurality of candidates for a code word building method such that the obtained accumulated value is most approximate to zero (S3).

Described next with reference to FIG. 4 is processing of the average level calculator 112 in the case of selecting a code word building method on the basis of the condition A. The other case of selection based on the condition B will be described later with reference to FIG. 5.

FIG. 4 exemplifies a case where two candidates (methods (a) and (b)) for a code word building method are prepared preliminarily. The number of candidates for a code word building method prepared preliminarily is not limited to two, but may be any number as long as it is plural.

The average level calculator 112 has an average signal level of symbols included in four most recent code words out of symbols having been transmitted. This is easily achieved by storing an average value of the signal levels of the symbols in each of the code words formed in accordance with the selected code word building methods in previous data transmission.

In step S2, the average level calculator 112 calculates the average value (0.04) of the signal levels of the symbols included in the code word formed by encoding the data to be subsequently transmitted in accordance with the candidate (a) for a code word building method and the average value (0.16) of the signal levels of the symbols included in the code word formed by encoding the data in accordance with the candidate (b) for a code word building method. The average level calculator 112 subsequently calculates an average value of signal levels of symbols included in five code words in accordance with each of the candidates (a) and (b) for a code word building method, on the basis of the average value for the data to be subsequently transmitted and an average value for most recent four code words.

Then in step S3, the average level calculator 112 compares the average values of the signal levels for the five code words, and selects the code word building method that achieves the average value more approximate to the voltage center, as the code word building method for data to be transmitted. FIG. 4 exemplifies a case where the candidate (a) is selected as the code word building method for data to be transmitted.

FIG. 4 exemplifies the case of using, for calculation of the average value of the signal levels, most recent 330 symbols ((66 symbols×4) for the four code words having been transmitted and symbols (66 symbols) for a code word to be transmitted). It is noted that this is merely an example, and the number of symbols used for calculation of an average value may be different from the above. The number of symbols used for calculation of an average value is desirably larger than the number of symbols included in a period corresponding to a reciprocal of a lower cutoff frequency of a transmission line.

Described next with reference to FIG. 5 is processing of the average level calculator 112 in the case of selecting a code word building method on the basis of the condition B.

Similarly to FIG. 4, FIG. 5 exemplifies a case where two candidates (methods (a) and (b)) for a code word building method are prepared preliminarily. The number of candidates for a code word building method prepared preliminarily is not limited to two, but may be any number as long as it is plural.

The average level calculator 112 has an accumulated value of differences between the voltage center and symbols having been transmitted. This is easily achieved by accumulatively storing differences between the voltage center and the symbols for the code words formed in accordance with the selected code word building methods in previous data transmission.

In step S2, the average level calculator 112 calculates the total value (0.10) of the differences between the voltage center and the signal levels of the symbols included in the code word formed by encoding the data to be subsequently transmitted in accordance with the candidate (a) for a code word building method, and the total value (0.20) of the differences between the voltage center and the signal levels of the symbols included in the code word formed by encoding the data in accordance with the candidate (b) for a code word building method. The average level calculator 112 subsequently totals an accumulated value of differences between the voltage center and the signal levels of the symbols having been transmitted and the total value of the differences between the voltage center and the signal levels of the symbols included in the code word formed in accordance with each of the candidates (a) and (b) for a code word building method, to obtain an accumulated value of differences between the voltage center and the signal levels of the symbols for each of the candidates (a) and (b) for a code word building method. There is thus obtained the accumulated value of the differences between the voltage center and the signal levels of the symbols that include both the symbols having been transmitted and the symbols to be subsequently transmitted, for each of the candidates for a code word building method.

Then in step S3, the average level calculator 112 compares the accumulated values and selects the code word building method that achieves the accumulated value more approximate to zero, as the code word building method for data to be transmitted. FIG. 5 exemplifies a case where the candidate (a) is selected as the code word building method for data to be transmitted.

FIG. 5 exemplifies the case where the symbols used for calculation of the accumulated value of the signal levels include all the symbols having been transmitted from the start of transmission. This is advantageous in a case where the lower cutoff frequency of the transmission line is sufficiently small. It is noted that this is merely an example, and the number of symbols used for calculation of an accumulated value may be different from the above.

Referring again to FIG. 3, the signal converter 114 of the transmitter 100T converts the transmission scrambled data 133a and 133b in accordance with the code word building method indicated by the selection signal 134 received from the average level calculator 112, generates the header bits 135a and 135b including information on the selected code word building method, and transmits to the parallel/serial converters 115a and 115b as the transmission converted data 136a and 136b and the header bits 135a and 135b, respectively. The parallel/serial converters 115a and 115b convert the transmission converted data 136a and 136b and the header bits 135a and 135b into serial signals, and transmit to the multilevel modulator 117 as the modulation input signals 137a and 137b. The multilevel modulator 117 executes four multilevel amplitude modulation on information of two bits formed by a bit of the modulation input signal 137a as an upper bit and a bit of the modulation input signal 137b as a lower bit, and transmits as the transmission signal 139 (S4).

As having been described, the transmitter 100T according to the present embodiment selects one of the plurality of candidates for a code word building method every time data corresponding to one code word is modulated. Such selection is made so as to enlarge the effect of reducing deviation in signal level. The transmitter 100T is thus capable of keeping DC balance of a transmission signal in a more profitable state in comparison to a conventional case. In particular, the transmitter 100T is capable of reducing short-term (of time scale equivalent to time necessary for transmission of one code word) deviation in signal level, and is thus capable of reducing fluctuation of short-term DC balance.

2-2. Receiver

Described next is a demodulation unit (multilevel amplitude demodulation device; hereinafter, abbreviated as "receiver" unless otherwise misunderstood particularly) included in the receiver according to the first embodiment. The receiver is capable of receiving a transmission signal from the transmitter 100T and demodulating the received signal.

2-2-1. Configuration

Figure 6:
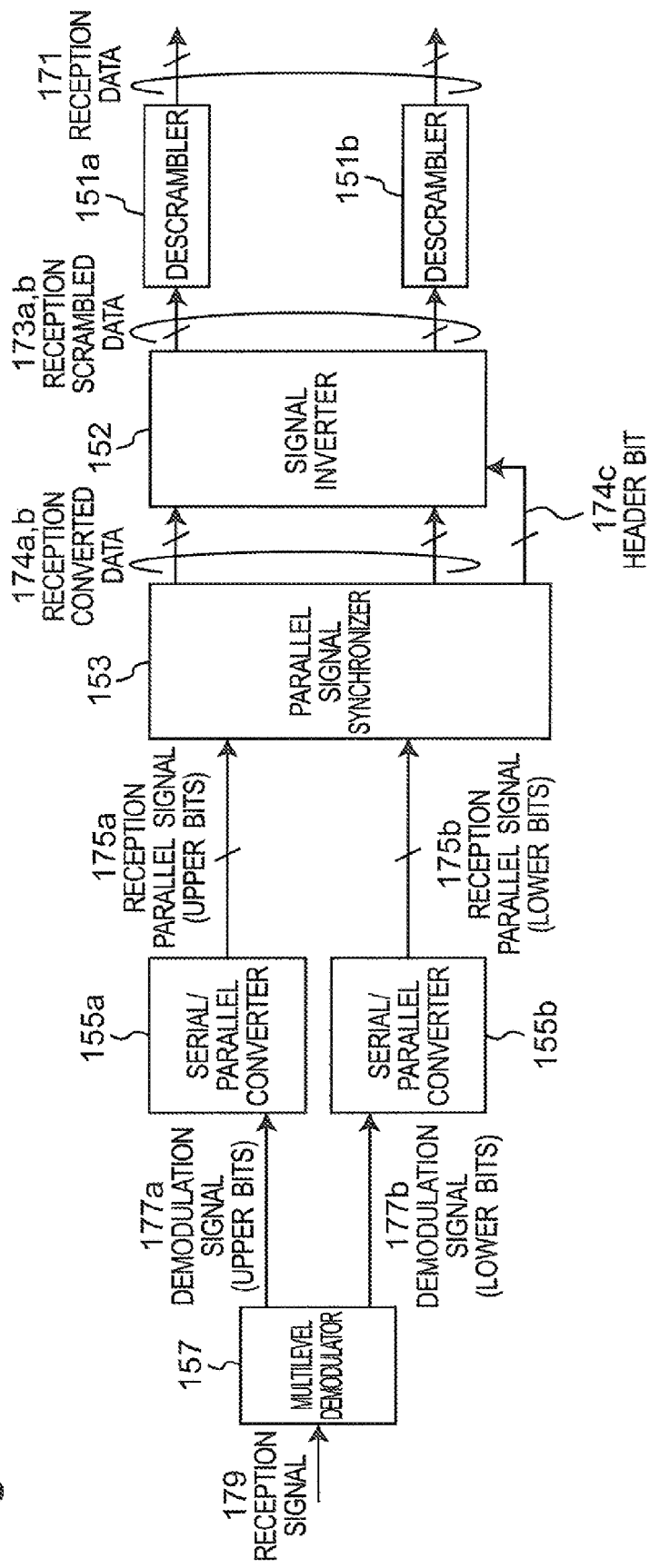
FIG. 6 is a block diagram of a configuration of a receiver according to the first embodiment.

FIG. 6 is a block diagram showing a configuration of a receiver 100R according to the first embodiment. This figure mainly depicts a configuration of the demodulation unit included in the receiver 100R. The configuration of portions other than the demodulation unit in the receiver 100R is not depicted where appropriate in order to simplify the figure.

The receiver 100R according to the first embodiment includes a multilevel demodulator 157, serial/parallel converters 155a and 155b, a parallel signal synchronizer 153, a signal inverter 152, and descramblers 151a and 151b.

The multilevel demodulator 157 receives and demodulates a multilevel amplitude modulation signal (reception signal 179 (transmission signal 139 in FIG. 1)), and outputs a demodulation signal 177a (upper bit) and a demodulation signal 177b (lower bit). The multilevel demodulator 157 can be configured on the basis of the conventional art.

The serial/parallel converter 155a receives the demodulation signal 177a to execute serial/parallel conversion and outputs a reception parallel signal 175a (upper bit). The serial/parallel converter 155a can be configured on the basis of the conventional art.

The serial/parallel converter 155b receives the demodulation signal 177b to execute serial/parallel conversion and outputs a reception parallel signal 175b (lower bit). The serial/parallel converter 155b can be configured on the basis of the conventional art.

The parallel signal synchronizer 153 receives the reception parallel signals 175a and 175b, detects and outputs header bits 174c included in the signals 175a and 175b, restores the order of bits of the signals 175a and 175b on the basis of the detected header bits, and outputs as reception converted data 174a and 174b. The parallel signal synchronizer 153 can be configured on the basis of the conventional art.

The signal inverter 152 identifies the code word building method on the basis of the header bits 174c, and applies inverse conversion in accordance with the identified method to the reception converted data 174a and 174b. Pieces of reception scrambled data 173a and 173b thus obtained are transmitted to the descramblers 151a and 151b, respectively. Such "inverse conversion" made by the signal inverter 152 in accordance with the inverse conversion corresponding to the identified code word building method can include simply outputting the reception converted data 174a and 174b as the reception scrambled data 173a and 173b (no conversion).

The descramblers 151a and 151b receive and descramble the reception scrambled data 173a and 173b, respectively, and output as reception data 171. The descramblers 151a and 151b can be configured on the basis of the conventional art.

When the scramblers 111a and 111b are not included in the transmitter 100T, the descramblers 151a and 151b are not provided either.

2-2-2. Operation

Figure 7:
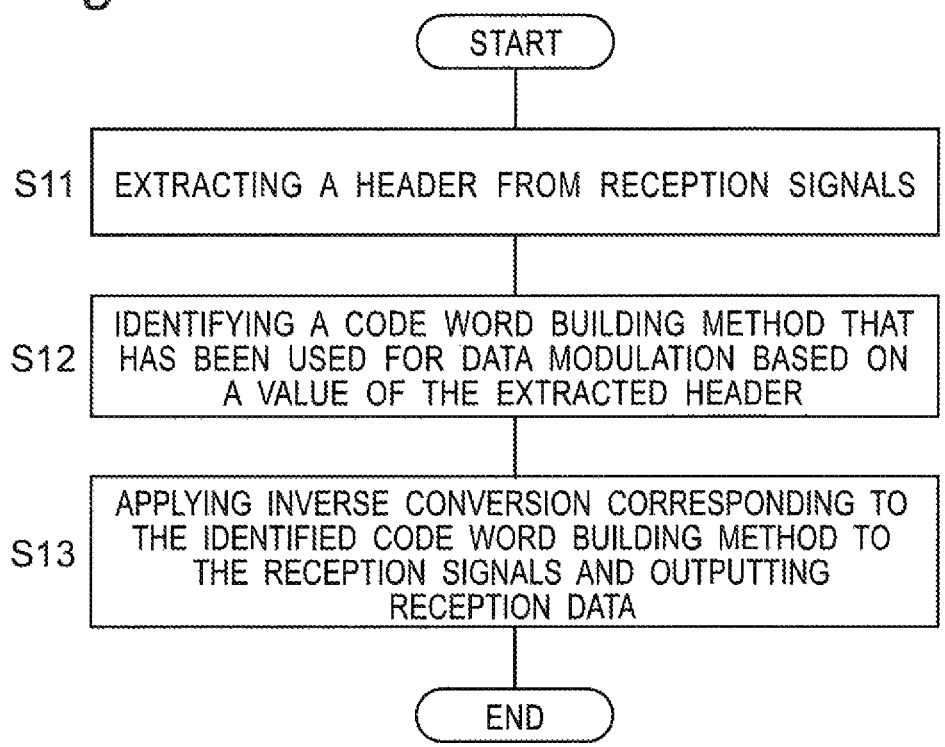
FIG. 7 is a flowchart of processing of the receiver.

Operation of the receiver 100R is described below with reference to FIG. 7. FIG. 7 is a flowchart showing processing of the receiver 100R.

When the receiver 100R receives the reception signal 179, the parallel signal synchronizer 153 therein outputs, to the signal inverter 152, a parallel signal (the reception converted data 174a and 174b as well as the header bits 174c) corresponding to the reception signal 179 (S11).

The signal inverter 152 identifies the code word building method employed for encoding the data in the generation of the multilevel amplitude modulation signal, on the basis of the values of the header bits 174c (S12).

The signal inverter 152 applies, to the reception converted data 174a and 174b, inverse conversion corresponding to the code word building method identified in step S12, transmits reception scrambled data 173a and 173b thus obtained to the descramblers 151a and 151b, respectively. The descramblers 151a and 151b descramble the reception scrambled data 173a and 173b and output reception data 171 thus obtained (S13).

If a different code word building method is employed to the reception signal 179, there are generally obtained different pieces of reception converted data 174a and 174b from the reception signal 179 that is generated by applying multilevel amplitude modulation to the same pieces of transmission scrambled data 133a and 133b (FIG. 1). According to the present embodiment, the transmitter 100T forms a code word such that a header includes information on the selected and employed code word building method, whereas the receiver 100R identifies the employed code word building method on the basis of the information on the code word building method in the header bits 174c and executes inverse conversion corresponding to the identified code word building method. In this manner, there are obtained correct pieces of reception converted data 174a and 174b. The DC balance of the reception signal 179 is thus constantly kept in a profitable state in the present embodiment. Consequently, in comparison to the conventional case, the receiver 100R is capable of reliably and correctly generating reception data 171 from a signal transmitted from the transmitter 100T in accordance with a multilevel amplitude modulation scheme.

2-3. Transmission System 2-3-1. Configuration

Figure 8:
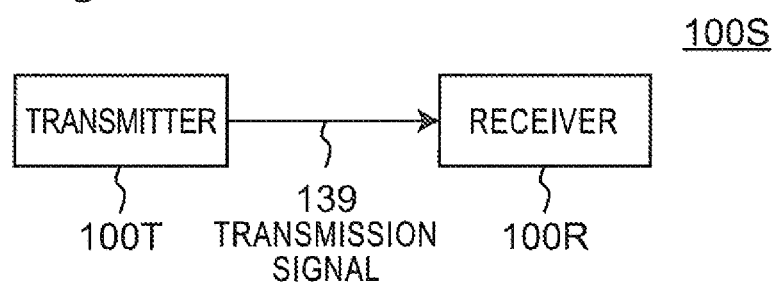
FIG. 8 is a block diagram of a configuration of a transmission system according to the first embodiment.

FIG. 8 is a block diagram showing a configuration of a transmission system 100S according to the present embodiment. The transmission system 100S includes the transmitter 100T and the receiver 100R. It is noted that there is no particular limitation to the transmission line used for transmitting a transmission signal 139 from the transmitter 100T to the receiver 100R.

2-3-2. Operation

The transmitter 100T transmits the transmission signal 139 to the receiver 100R in the manner described in the section 2-1. Upon receipt of the transmission signal 139, the receiver 100R generates the reception data 171 in the manner described in the section 2-2.

This transmission system 100S reduces deviation in signal level of multilevel amplitude modulation signals repetitively in cycles of time scale equivalent to time necessary for transmission of one code word. The DC balance of the multilevel amplitude modulation signals is kept desirably on both long-term and short-term bases. As a result, this transmission system 100S realizes more reliable data transmission in comparison to the conventional case.

3. Second Embodiment 3-1. Transmitter

The transmitter according to the second embodiment has a significant feature as to a plurality of candidates for a code word building method preliminarily prepared by itself. More specifically, the candidates for a code word building method according to the present embodiment each employ a header that includes symbols having an average value in signal level different from average values of other candidates. The transmitter according to the present embodiment selects a code word building method, in other words, a header, so as to satisfy either one of the conditions A and B. Hereinafter, the configuration and operation similar to those of the other embodiments are not described where appropriate.

3-1-1. Configuration

Figure 9:
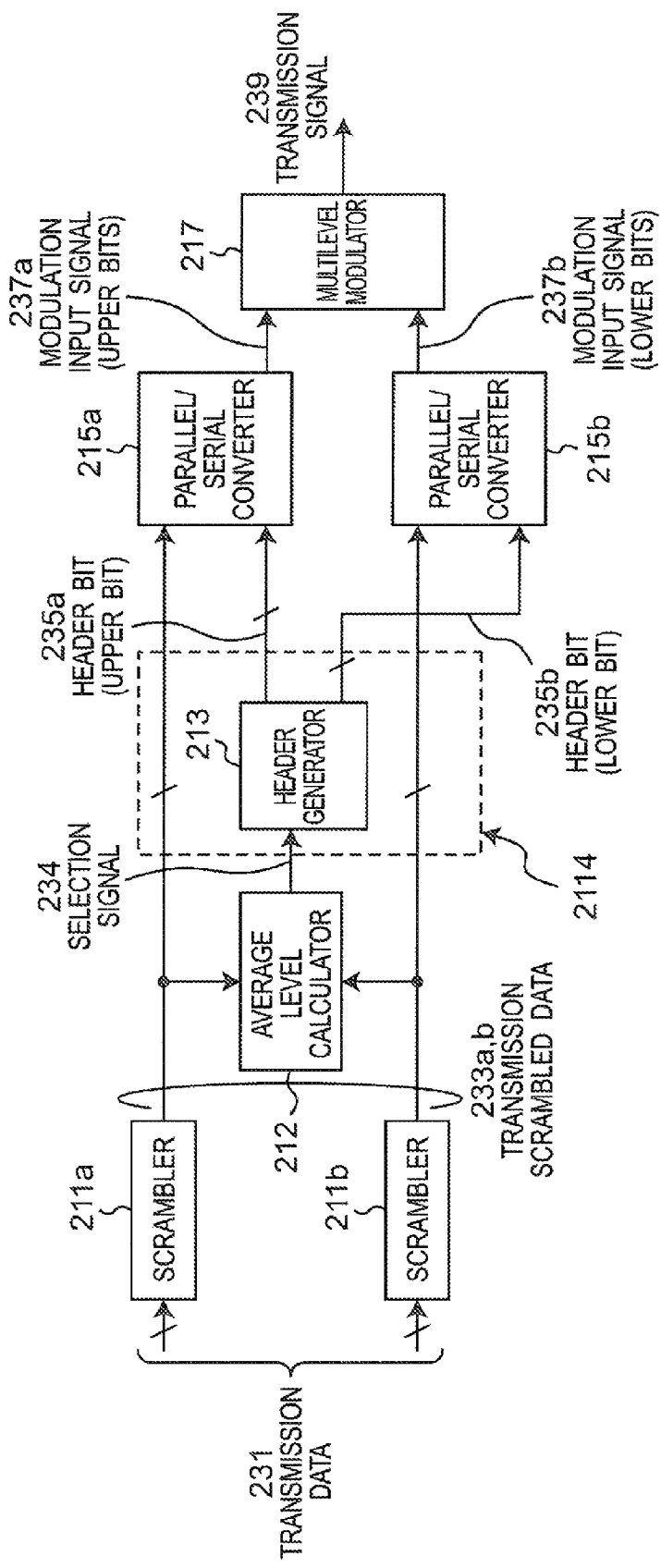
FIG. 9 is a block diagram of a configuration of a transmitter according to a second embodiment.

FIG. 9 is a block diagram showing a configuration of a transmitter 200T according to the second embodiment;

The transmitter 200T according to the second embodiment includes scramblers 211a and 211b, an average level calculator 212, a signal converter 2114 (header generator 213), parallel/serial converters 215a and 215b, and a multilevel modulator 217.

The scramblers 211a and 211b can be configured similarly to the scramblers 111a and 111b in the transmitter 100T. The scramblers 211a and 211b may not be provided, similarly to the first embodiment.

Similarly to the average level calculator 112 in the transmitter 100T according to the first embodiment, the average level calculator 212 selects a candidate for a code word building method to be employed for encoding transmission scrambled data 233a and 233b, and outputs a selection signal 234 indicating the selected candidate for a code word building method. As described above, the plurality of candidates for a code word building method according to the present embodiment are different from one another only in the average value in signal level of symbols forming a header, and are not different from one another in a method of forming a payload and the like. The average level calculator 212 according to the present embodiment thus selects a header and outputs a selection signal indicating the selected header.

Similarly to the signal converter 114 in the transmitter 100T according to the first embodiment, the signal converter 2114 (header generator 213) converts the transmission scrambled data 233a and 233b on the basis of the selection signal 234 in accordance with the selected code word building method, and outputs as transmission converted data. The signal converter 2114 also generates a header of the code word in accordance with the selected code word building method and outputs as header bits 235a and 235b. According to the present embodiment, the signal converter 2114 forms a header on the basis of the selection signal 234 and outputs as the header bits 235a and 235b. Also, the signal converter 2114 simply outputs the received transmission scrambled data 233a and 233b as transmission converted data irrespective of the selected code word building method. In the present embodiment, the header may not include information as to which one of the code word building methods is selected.

The parallel/serial converters 215a and 215b can be configured similarly to the parallel/serial converters 115a and 115b in the transmitter 100T.

The multilevel modulator 217 can be configured similarly to the multilevel modulator 117 in the transmitter 100T.

3-1-2. Operation

Operation of the transmitter 200T according to the present embodiment is described next with reference to FIGS. 10 to 11. In this section also, the configuration similar to that of any of the other embodiments is not described where appropriate.

Figure 10:
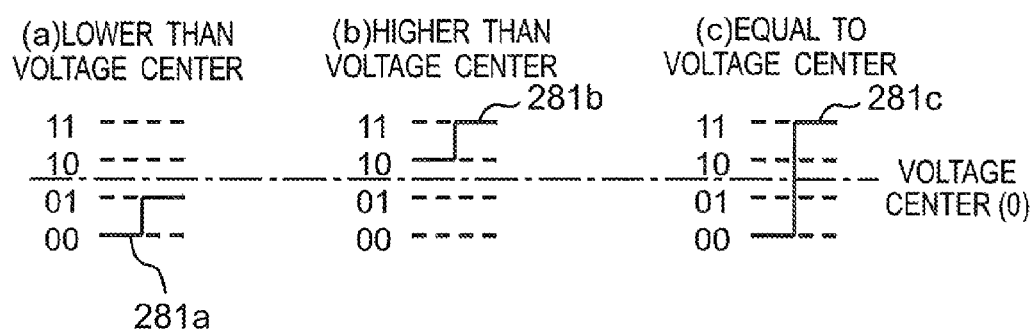
FIG. 10 is diagram showing examples of headers used in the second embodiment.

FIG. 10 is diagram showing configuration examples of headers used in the plurality of candidates for a code word building method. A header 281a in a candidate (a) for a code word building method has an average value in signal level of symbols forming the header being smaller than the voltage center. A header 281b in a candidate (b) for a code word building method has an average value in signal level of symbols forming the header being equal to the voltage center. A header 281c in a candidate (c) for a code word building method has an average value in signal level of symbols forming the header being larger than the voltage center. In this example, the three candidates for a code word building method have corresponding headers of the three types, namely, a header having an average value in signal level being smaller than the voltage center, a header having an average value in signal level being equal to the voltage center, and a header having an average value in signal level being larger than the voltage center. It is noted that there is no limitation to combination of headers of a plurality of types corresponding to a plurality of candidates for a code word building method. Furthermore, in this example, each of the headers absolutely includes signal transition so that a receiving device easily detects a header to restore the order of bits of a parallel signal.

Figure 11:
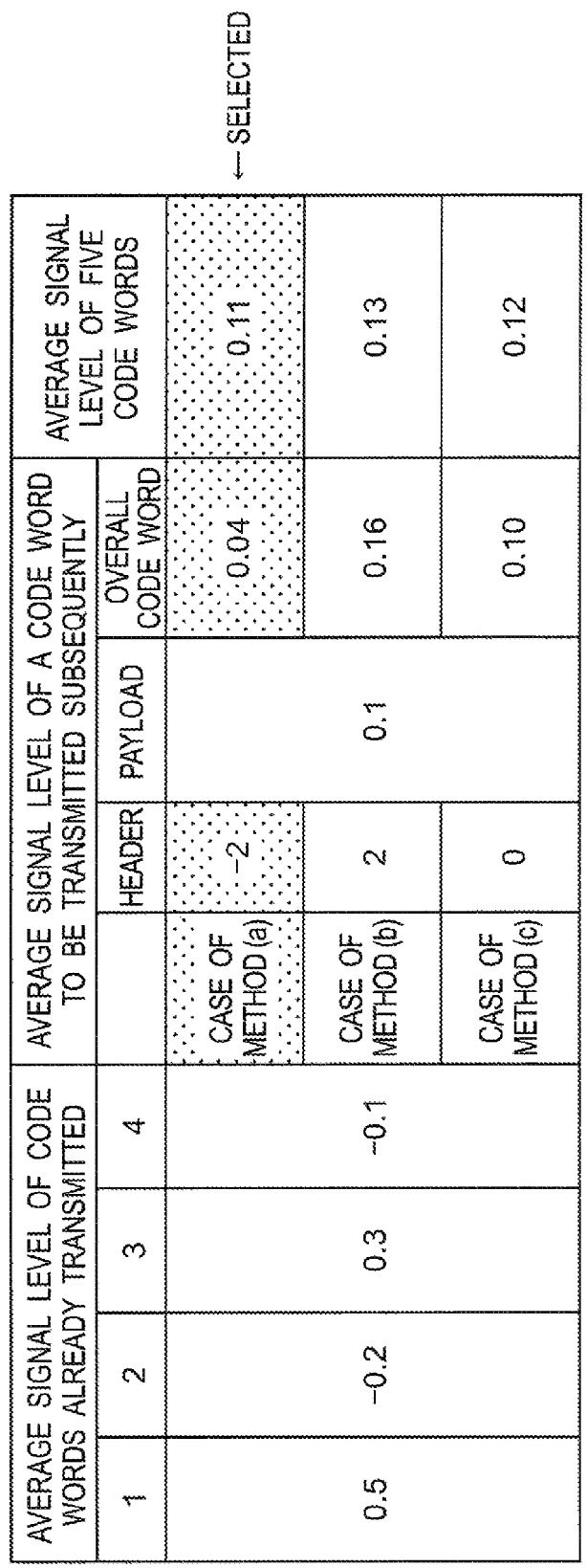
FIG. 11 is a chart showing examples of determination of a code word building method based on an average signal level of symbols for most recent code words of a predetermined number.

Described next with reference to FIG. 11 is a procedure of the average level calculator 212 that selects one of the plurality of candidates for a code word building method so as to satisfy the condition A.

The average level calculator 212 in the transmitter 200T receives the transmission scrambled data 233a and 233b of data to be transmitted, and converts these pieces of data into code words in accordance with each of the plurality of candidates for a code word building method, in other words, by changing only the header (S1 in FIG. 3). There are thus obtained a plurality of code words formed (by different headers) in accordance with the plurality of code word building methods different from one another.

The average level calculator 212 then calculates an average value (rightmost column in FIG. 11) of signal levels of symbols included in each of the code words thus formed and signal levels of symbols included in a modulation signal (transmission signal 239) sequence having been transmitted (S2 in FIG. 3).

The average level calculator 212 selects the code word building method, in other words, the header, which achieves the obtained average value (average signal level) most approximate to the voltage center, from among the plurality of candidates for a code word building method (plurality of headers) (S3 in FIG. 3). In the example of FIG. 11, the average level calculator 212 selects the candidate (a) (FIG. 10) as the header of the data to be transmitted, and transmits a selection signal 234 indicating the selected header to the signal converter 2114 (header generator 213). The header generator 213 of the signal converter 2114 generates header bits 235a and 235b on the basis of the selection signal 234 and outputs these header bits.

A procedure of the average level calculator 212 that selects one of the candidates for a code word building method so as to satisfy the condition B is not described herein. Similarly to the first embodiment, the average level calculator 212 is capable of selecting, on the basis of the condition B, one of the candidates for a code word building method so as to satisfy the condition B.

The parallel/serial converter 215a and 215b convert transmission converted data (transmission scrambled data 233a and 233b) and the header bits 235a and 235b into serial signals, and transmit to the multilevel modulator 217 as modulation input signals 237a and 237b. The multilevel modulator 217 executes four multilevel amplitude modulation on information of two bits formed by a bit of the modulation input signal 237a as an upper bit and a bit of the modulation input signal 237b as a lower bit, and transmits as the transmission signal 239 (S4 in FIG. 3).

As having been described, the transmitter 200T according to the present embodiment selects one of the plurality of headers for each of the code words upon data modulation. Such selection is made so as to enlarge the effect of reducing deviation in signal level. The transmitter 200T is thus capable of keeping DC balance of a transmission signal in a more profitable state in comparison to a conventional case. The transmitter 200T is capable of reducing extremely short-term (of time scale equivalent to time necessary for transmission of one code word) deviation in signal level, and is thus capable of reducing fluctuation of short-term DC balance. In particular, the transmitter 200T reduces deviation in signal level only by changing a header. It is advantageous in that a receiving device does not need to analyze a header to identify a code word building method.

The header can include information facilitating identification of the type of data stored in a payload.

3-2. Receiver

3-2-1. Configuration and Operation

Figure 23:
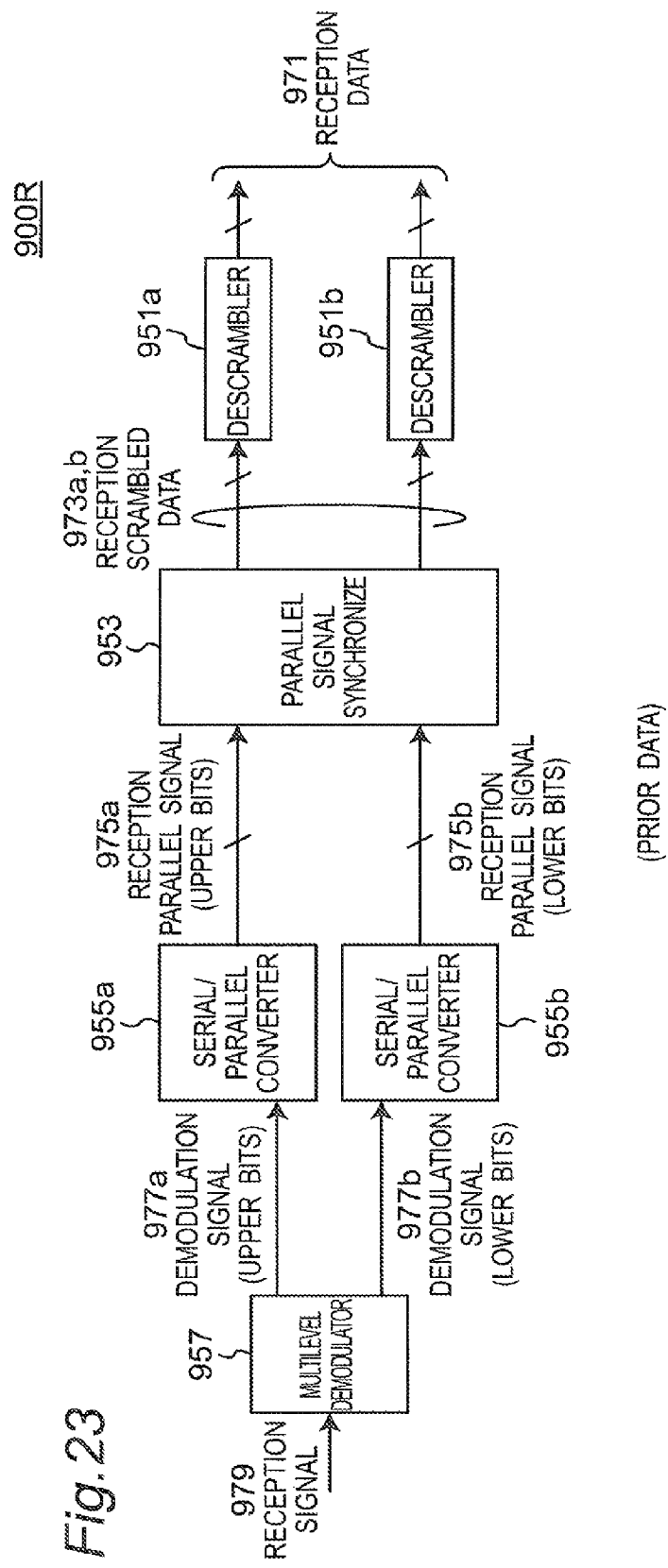
FIG. 23 is a block diagram of a receiver according to the conventional art.
Figure 24:
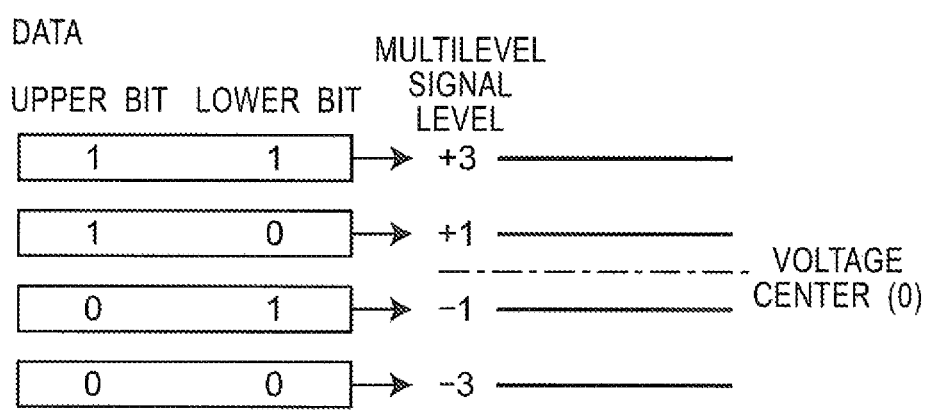
FIG. 24 is a diagram of an example of data arrangement in a multilevel signal.

The transmitter 200T according to the present embodiment reduces deviation in signal level only by changing a header. The receiver can be thus configured only on the basis of the conventional art. The receiver according to the present embodiment can be configured as a receiver 900R exemplified in FIG. 23.

3-3. Transmission System

3-3-1. Configuration and Operation

A transmission system according to the present embodiment can include the transmitter 200T and, for example, the receiver 900R. The transmission system according to the present embodiment is not described in this section because the transmission system operates similarly to the transmission system 100S according to the first embodiment.

This transmission system according to the present embodiment reduces deviation in signal level of multilevel amplitude modulation signals repetitively in cycles of time scale equivalent to time necessary for transmission of one code word. The DC balance of the multilevel amplitude modulation signals is kept desirably on both long-term and short-term bases. As a result, this transmission system realizes more reliable data transmission in comparison to the conventional case. This transmission system is also advantageous in that the receiver can be configured more simply as compared with the transmission system 100S.

4. Third Embodiment

4-1. Transmitter

The transmitter according to the third embodiment has a significant feature as to a plurality of candidates for a code word building method preliminarily prepared by itself. More specifically, the candidates for a code word building method according to the present embodiment are different from the candidates according to other embodiments in arrangement of data on multiple signal levels. The transmitter according to the present embodiment selects a code word building method, in other words, arrangement of data on multiple signal levels, so as to satisfy either one of the conditions A and B. A header is formed so as to include information on the selected arrangement.

Hereinafter, the configuration and operation similar to those of the other embodiments are not described where appropriate.

4-1-1. Configuration

Figure 12:
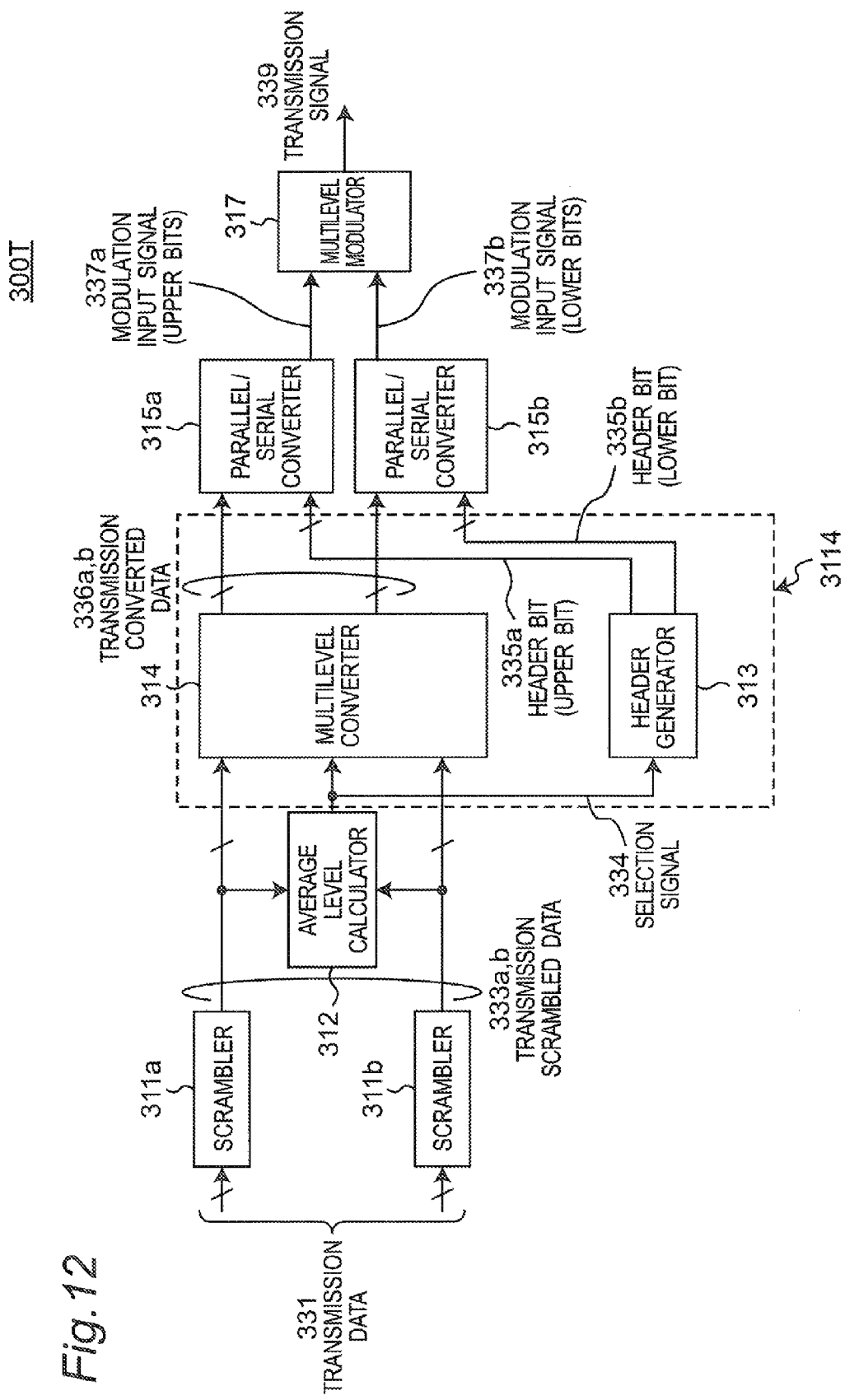
FIG. 12 is a block diagram showing a configuration of a transmitter according to a third embodiment.

FIG. 12 is a block diagram showing a configuration of a transmitter 300T according to the third embodiment.

The transmitter 300T according to the third embodiment includes scramblers 311a and 311b, an average level calculator 312, a signal converter 3114 (header generator 313 and multilevel converter 314), parallel/serial converters 315a and 315b, and a multilevel modulator 317.

The scrambler 311a and 311b can be configured similarly to those of the transmitter 100T or 200T. The scramblers 311a and 311b may not be provided, similarly to the other embodiments.

Similarly to the average level calculators according to the other embodiments, the average level calculator 312 selects a candidate for a code word building method to be employed for encoding transmission scrambled data 333a and 333b, and outputs a selection signal 334 indicating the selected candidate for a code word building method. As described above, the plurality of candidates for a code word building method according to the present embodiment are different from one another in arrangement of data on multiple signal levels. The average level calculator 312 according to the present embodiment selects arrangement of data on multiple signal levels, and outputs the selection signal 334 indicating the selected arrangement.

Similarly to the signal converters according to the other embodiments, the signal converter 3114 (header generator 313 and multilevel converter 314) converts the transmission scrambled data 333a and 333b on the basis of the selection signal 334 in accordance with the selected code word building method (selected arrangement), and outputs as transmission converted data 336a and 336b. The signal converter 3114 also generates a header of the code word in accordance with the selected code word building method and outputs as header bits 335a and 335b. The present embodiment is different from the second embodiment in that the header is formed so as to include information as to which one of the code word building method is selected.

The parallel/serial converters 315a and 315b can be configured similarly to those of the transmitter 100T or 200T.

The multilevel modulator 317 can be configured similarly to that of the transmitter 100T or 200T.

4-1-2. Operation

Operation of the transmitter 300T according to the present embodiment is described next with reference to FIGS. 13A to 16. In this section also, the configuration similar to that of any of the other embodiments is not described where appropriate.

FIGS. 13A and 13B are diagrams each showing examples of arrangement of data on multiple signal levels in each of the plurality of candidates for a code word building method. Arrangement 1 of data on signal levels in a candidate (a) for a code word building method and arrangement 2 in a candidate (b) for a code word building method are symmetrical with each other with respect to the voltage center. In this example, the two types of arrangement patterns corresponding to the two candidates for a code word building method are symmetrical with each other with respect to the voltage center. It is noted that there is no limitation to combination of arrangement of a plurality of types preliminarily prepared.

Figure 14:
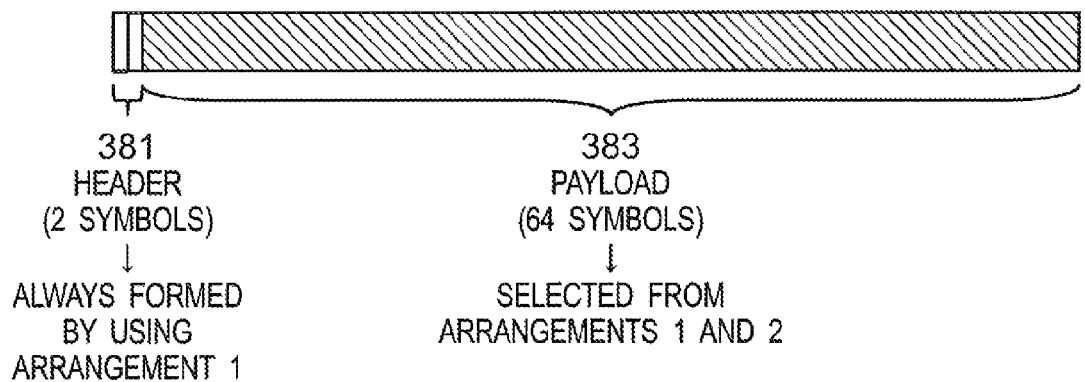
FIG. 14 is a schematic diagram of a configuration of a code word in the third embodiment.

FIG. 14 is a diagram schematically depicting a code word included in a transmission signal 339 to be outputted from the transmitter 300T. The code word includes a header 381 of 2 symbols, and a payload 383 of 64 symbols. The header 381 is steadily formed in accordance with the arrangement 1 (FIG. 13A) and includes information on arrangement applied to the payload 383. In other words, the arrangement applied to the header 381 is fixed to the arrangement 1. In the payload 383, arrangement to be applied can be switched per unit of a code word.

Figure 15A:
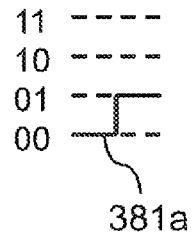
FIGS. 15A and 15B are diagrams each showing an example of a header used in the third embodiment.
Figure 15B:

FIGS. 15A and 15B are diagrams each showing an example of the configuration of the header 381. In this manner, the header 381 is formed so as to include information on arrangement applied to the payload 383. In this example, the header is formed as a header 381a when the arrangement 1 is applied to the payload 383, whereas the header is formed as a header 381b when the arrangement is applied to the payload 383. A receiving device is thus capable of correctly recognizing arrangement applied to the payload 383 by analyzing the header. Furthermore, in this example, each of the headers 381a and 381b absolutely includes signal transition so that a receiving device easily detects a header.

Described next with reference to FIG. 16 is a procedure of the average level calculator 312 that selects one of the plurality of candidates for a code word building method so as to satisfy the condition A.

The average level calculator 312 in the transmitter 300T receives the transmission scrambled data 333a and 333b of data to be transmitted, and converts these pieces of data into code words in accordance with each of the plurality of candidates for a code word building method, in other words, by changing arrangement of the data on multiple signal levels (S1 in FIG. 3). There are thus obtained a plurality of code words formed (so as to be different in arrangement) in accordance with the plurality of code word building methods different from one another.

The average level calculator 312 then calculates an average value (rightmost column in FIG. 16) of signal levels of symbols included in each of the code words thus formed and signal levels of symbols included in a modulation signal (transmission signal 339) sequence having been transmitted (S2 in FIG. 3).

The average level calculator 312 selects the code word building method, in other words, the arrangement, which achieves the obtained average value (average signal level) most approximate to the voltage center, from among the plurality of candidates for a code word building method (plurality of arrangement patterns) (S3 in FIG. 3). In the example of FIG. 16, the average level calculator 312 selects the arrangement 2 (FIG. 13B) of the candidate (b) as the arrangement of the data to be transmitted on multiple signal levels, and transmits the selection signal 334 indicating the selected arrangement to the signal converter 3114 (header generator 313 and multilevel converter 314). The header generator 313 of the signal converter 3114 generates header bits 335a and 335b on the basis of the selection signal 334 and outputs these header bits. The multilevel converter 314 of the signal converter 3114 forms a payload on the basis of the selection signal 334, and outputs as transmission converted data 336a and 336b.

In the case of forming the payload by applying one of the two types of arrangement patterns symmetrical with each other with respect to the voltage center as shown in FIGS. 13A and 13B, for example, the average level calculator can output, to the multilevel converter 314, a selection signal 312 of the value "0" when applying the arrangement 1, and a selection signal 312 of the value "1" when applying the arrangement 2. In this manner, the multilevel converter 314 can execute an exclusive-OR operation between each of the bits of the transmission scrambled data 333a and 333b and the selection signal 334 so as to output transmission converted data 336a and 336b thus obtained. This is because data on the signal levels in the arrangement 1 and data on the signal levels in the arrangement 2 are different in data bits inverted from each other. The configuration of the multilevel converter 314 is not limited to that of the above example.

A procedure of the average level calculator 312 that selects one of the candidates for a code word building method so as to satisfy the condition B is not described herein. Similarly to the other embodiments, the average level calculator 312 is capable of selecting, on the basis of the condition B, one of the candidates for a code word building method so as to satisfy the condition B.

The parallel/serial converter 315a and 315b convert the transmission converted data 336a and 336b and the header bits 335a and 335b into serial signals, and transmit to the multilevel modulator 317 as modulation input signals 337a and 337b. The multilevel modulator 317 executes four multilevel amplitude modulation on information of two bits formed by a bit of the modulation input signal 337a as an upper bit and a bit of the modulation input signal 337b as a lower bit, and transmits as the transmission signal 339 (S4 in FIG. 3).

FIGS. 13A and 13B show, as the candidates for a code word building method, the two types of signal level arrangement patterns symmetrical with each other with respect to the voltage center. It is noted that the arrangement patterns of data on multiple signal levels are not limited to the examples of FIGS. 13A and 13B. As alternatively shown in FIGS. 17A and 17B, the candidates for a code word building method employ the arrangement 1 and the arrangement 2 that have values of the uppermost bit in the data being inverted from each other. The combination of the arrangement patterns shown in FIGS. 17A and 17B increases selectability of arrangement while keeping the effect of reducing deviation in signal level, thereby realizing more flexible setting of signal arrangement.

The number of the arrangement patterns (the candidates for a code word building method) is not limited to two. It is possible to prepare and apply three or more arrangement patterns as the candidates for a code word building method. In this case, the types of headers can be increased so as to correspond to the number of arrangement patterns.

The number of symbols in the header and the value of the header mentioned above are merely examples. It is possible to use a header of a different value and a different number of symbols as long as there are prepared a plurality of types of headers having different average signal levels of symbols forming the headers and each of the headers absolutely includes signal transition. It is also possible to add the types of headers in order to distinguish data of a different type such as a control signal.

As having been described, the transmitter 300T according to the present embodiment selects one of the plurality of arrangement patterns of data on multiple signal levels for each of the code words upon data modulation. Such selection is made so as to enlarge the effect of reducing deviation in signal level. The transmitter 300T is thus capable of keeping DC balance of a transmission signal in a more profitable state in comparison to a conventional case. The transmitter 300T is capable of reducing extremely short-term (of time scale equivalent to time necessary for transmission of one code word) deviation in signal level, and is thus capable of reducing fluctuation of short-term DC balance.

4-2. Receiver

Described next is the receiver according to the third embodiment. The receiver is capable of receiving a transmission from the transmitter 300T and demodulating the received signal.

4-2-1. Configuration

Figure 18:
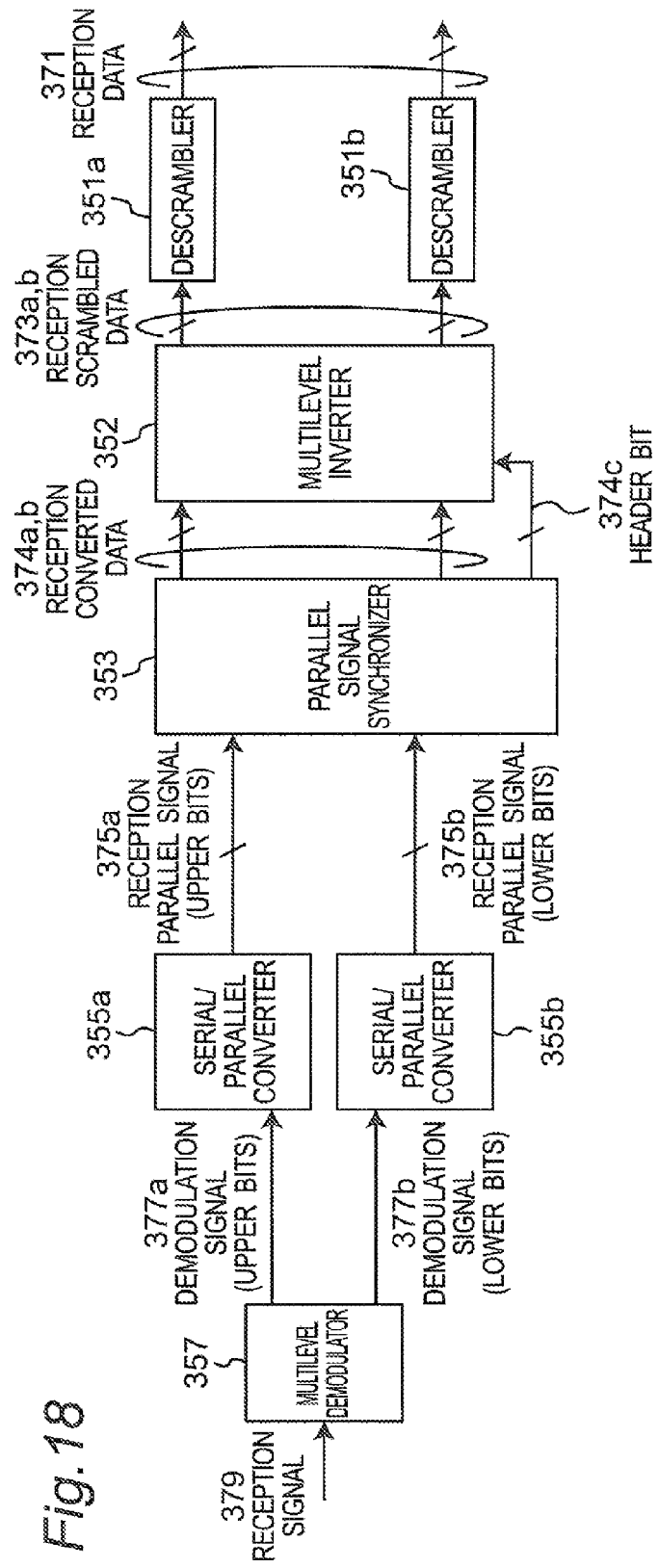
FIG. 18 is a block diagram of a configuration of a receiver according to the third embodiment.

FIG. 18 is a block diagram showing a configuration of a receiver 300R according to the third embodiment. This figure mainly depicts a configuration of a demodulation unit included in the receiver 300R. The configuration of portions other than the demodulation unit in the receiver 300R is not depicted where appropriate in order to simplify the figure.

The receiver 300R according to the third embodiment includes a multilevel demodulator 357, serial/parallel converters 355a and 355b, a parallel signal synchronizer 353, a signal inverter 352, and descramblers 351a and 351b.

The multilevel demodulator 357 can be configured similarly to the multilevel demodulator 157 in the receiver 100R, for example.

The serial/parallel converters 355a and 355b can be configured similarly to the serial/parallel converters 155a and 155b in the receiver 100R.

The parallel signal synchronizer 353 can be configured similarly to the parallel signal synchronizer 153 in the receiver 100R.

A multilevel inverter (signal inverter) 352 identifies the code word building method (the arrangement applied to the payload) on the basis of the header bit 374c, and applies inverse conversion in accordance with the identified method to the reception converted data 374a and 374b. Pieces of reception scrambled data 373a and 373b thus obtained are transmitted to the descramblers 351a and 351b, respectively. Such "conversion" made by the multilevel inverter (signal inverter) 352 in accordance with the inverse conversion corresponding to the identified code word building method can include simply outputting the reception converted data 374a and 374b as the reception scrambled data 373a and 373b (no conversion).

The descramblers 351a and 351b can be configured similarly to the descramblers 151a and 151b in the receiver 100R. The descramblers 351a and 351b may not be provided, similarly to the first embodiment.

4-2-2. Operation

Described below is operation of the receiver 300R.

When the receiver 300 receives a reception signal 379, the parallel signal synchronizer 353 therein outputs, to the multilevel inverter 352, a parallel signal (the reception converted data 374a and 374b as well as the header bit 374c) corresponding to the reception signal 379 (S11 in FIG. 7).

The multilevel inverter 352 identifies the code word building method employed for encoding the data in the generation of the multilevel amplitude modulation signal (the arrangement applied to the payload), on the basis of the value of the header bit 374c (S12 in FIG. 7).

The multilevel inverter 352 applies, to the reception converted data 374a and 374b, inverse conversion corresponding to the code word building method (the arrangement applied to the payload) identified in step S12 of FIG. 7, transmits reception scrambled data 373a and 373b thus obtained to the descramblers 351a and 351b, respectively. The descramblers 351a and 351b descramble the reception scrambled data 373a and 373b, and output reception data 371 thus obtained (S13 in FIG. 7).

In the case of forming the payload by applying one of the two types of arrangement patterns symmetrical with each other with respect to the voltage center as shown in FIGS. 13A and 13B and forming the header as shown in FIG. 15A or 15B, the multilevel inverter 352 can realize inverse conversion by executing an exclusive-OR operation between the upper bit of the header bit 374c and each of the bits of the reception converted data 374a and 374b and outputting reception scrambled data 373a and 373b thus obtained. The configuration of the multilevel inverter 352 is not limited to that of the above example.

As having been described, in comparison to the conventional case, the receiver 300R according to the present embodiment is capable of reliably and correctly generating reception data 371 on the basis of a signal transmitted from the transmitter 300T in accordance with a multilevel amplitude modulation scheme.

4-3. Transmission System 4-3-1. Configuration and Operation

The transmission system according to the present embodiment includes the transmitter 300T and the receiver 300R.

The transmission system according to the present embodiment is not described in this section because the transmission system operates similarly to the transmission systems according to the other embodiments.

5. Fourth Embodiment

5-1. Transmitter

The present embodiment is regarded as a modification example of the third embodiment. Similarly to the transmitter 300T of the third embodiment, the transmitter according to the fourth embodiment preliminarily has, as a plurality of candidates for a code word building method, arrangement patterns of data on multiple signal levels different from one another. The transmitter according to the present embodiment switches arrangement not per unit of a code word but per unit of a divided portion of a payload. A header is formed so as to include information on the selected arrangement for each of the portions of the payload. Hereinafter, the configuration and operation similar to those of the other embodiments are not described where appropriate.

5-1-1. Configuration

The transmitter according to the present embodiment can be configured similarly to the transmitter 300T according to the third embodiment. In the transmitter according to the present embodiment, the average level calculator, the average level calculator, and the header generator operate differently from those of the transmitter 300T.

5-1-2. Operation

Operation of the transmitter according to the present embodiment is described next with reference to FIGS. 19 to 21B. In this section also, the configuration similar to that of any of the other embodiments is not described where appropriate.

Figure 19:
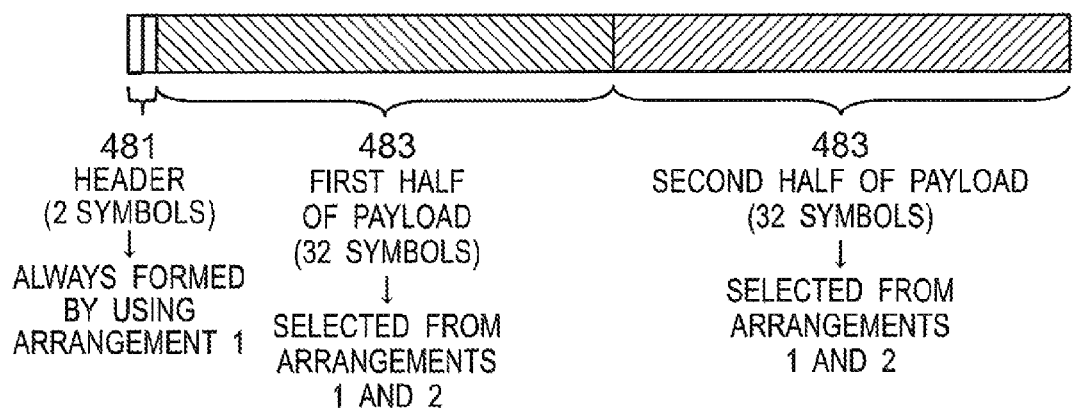
FIG. 19 is a schematic diagram of a configuration of a code word in a fourth embodiment.
Figure 22:
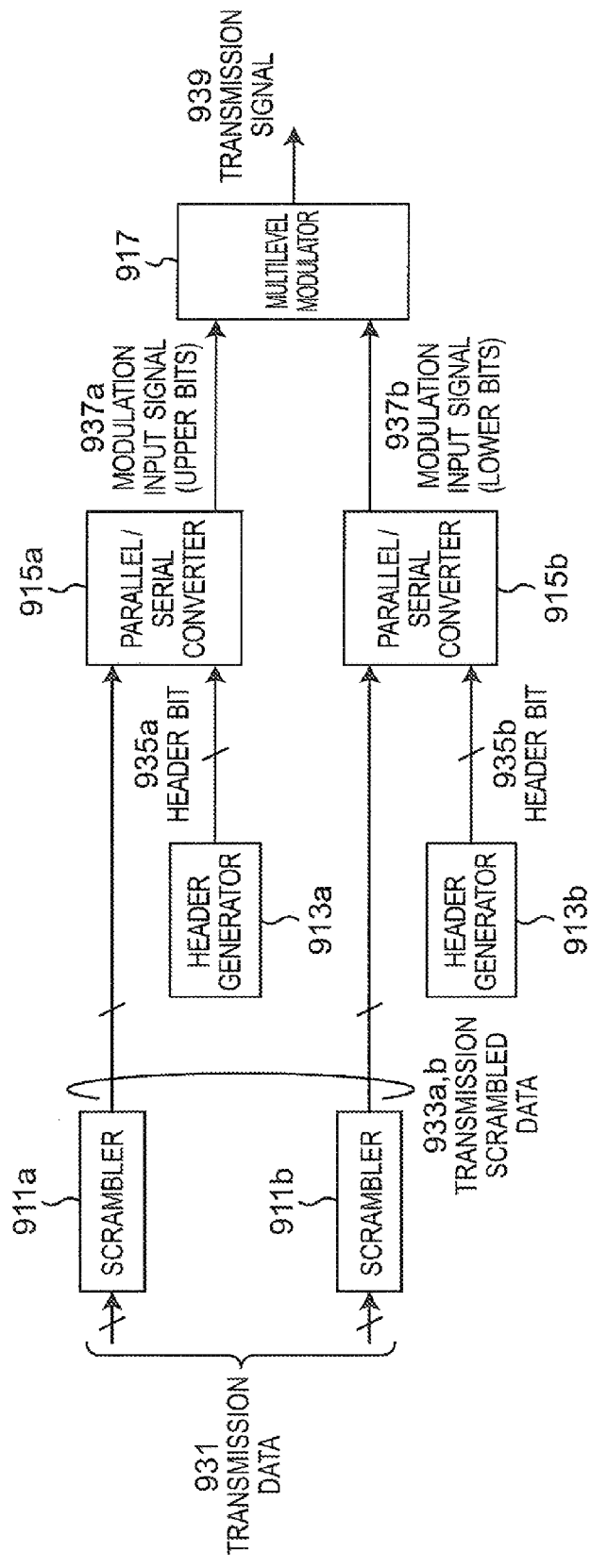
FIG. 22 is a block diagram of a transmitter according to the conventional art.

FIG. 19 is a diagram schematically depicting a code word included in a transmission signal to be outputted from the transmitter according to the present embodiment. The code word includes a header 481 of 2 symbols, and a payload 483 of 64 symbols. The header 481 is steadily formed in accordance with the arrangement 1 (FIG. 13A) and includes information on arrangement applied to each of the portions of the payload 483. In other words, the arrangement applied to the header 481 is fixed to the arrangement 1. In the payload 483, arrangement to be applied can be switched per unit of a divided portion of the predetermined payload. In this example, the payload is halved (into 32 symbols each), so as to independently select arrangement applied to the first half of the payload and arrangement applied to the second half of the payload. The number of divided portions of the payload is not limited to, but may be any plural number. Furthermore, the divided portions of the payload may not include symbols of the numbers equal to each other.

Four arrangement patterns can be thus applied per unit of a code word in the present embodiment. In other words, the transmitter according to the present embodiment is capable of selecting one of four candidates for a code word building method (arrangement patterns) and employing the selected method.

The header according to the present embodiment is formed to include information on combination of the four arrangement patterns. Furthermore, each header absolutely includes signal transition so that a receiving device easily detects a header.

FIGS. 20A to 20D exemplify headers used in the present embodiment. In this manner, the header generator according to the present embodiment forms headers so as to include information on arrangement applied to each of the divided portions of the payload, on the basis of a selection signal outputted from the average level calculator.

Described next with reference to FIGS. 21A and 21B is a procedure of the average level calculator according to the present embodiment which selects one of the plurality of candidates for a code word building method (the plurality of arrangement patterns and combination thereof) so as to satisfy the condition A.

The average level calculator according to the present embodiment receives transmission scrambled data of data to be transmitted, and converts these pieces of data into code words in accordance with each of the plurality of candidates for a code word building method, in other words, by changing arrangement, on multiple signal levels, of the data of each of the divided portions of the payload and combination of arrangement patterns applied to the entire code word (S1 in FIG. 3). There are thus obtained a plurality of code words formed (so as to be different in arrangement and combination thereof) in accordance with the plurality of code word building methods different from one another.

The average level calculator according to the present embodiment then calculates an average value (rightmost column in FIG. 21B) of signal levels of symbols included in each of the code words thus formed and signal levels of symbols included in a modulation signal (transmission signal) sequence having been transmitted (S2 in FIG. 3).

The average level calculator according to the present embodiment selects the code word building method, in other words, the arrangement patterns applied respectively to the divided portions of the payload and combination thereof in the entire code word, so as to achieve the obtained average value (average signal level) most approximate to the voltage center, from among the plurality of candidates for a code word building method (plurality of arrangement patterns and combination thereof) (S3 in FIG. 3). In the example of FIG. 21B, the average level calculator selects the candidate (c) (combination of the arrangement 2 for the first half of the payload and the arrangement 1 for the second half of the payload) as the arrangement patterns of the data to be transmitted on multiple signal levels, and transmits a selection signal indicating the selected arrangement patterns to the signal converter (header generator and multilevel converter). The header generator of the signal converter generates header bits on the basis of the selection signal and outputs these header bits. The multilevel converter of the signal converter forms a payload on the basis of the selection signal, and outputs as transmission converted data.

Similarly to the third embodiment, arrangement patterns of data on multiple signal levels according to the present embodiment are not limited to the examples of FIGS. 13A and 13B. Furthermore, the number of arrangement patterns is not limited to two, but three or more arrangement patterns can be prepared and switched with one another. In this case, the types of headers can be increased so as to correspond to the number of arrangement patterns.

A procedure of the average level calculator according to the present embodiment which selects one of the candidates for a code word building method so as to satisfy the condition B is not described herein. Similarly to the other embodiments, the average level calculator is capable of selecting, on the basis of the condition B, one of the candidates for a code word building method so as to satisfy the condition B.

The parallel/serial converters according to the present embodiment convert the transmission converted data and the header bits into serial signals, and transmit to the multilevel modulator as modulation input signals. The multilevel modulator executes four multilevel amplitude modulation on the modulation input signals, and transmits as a transmission signal (S4 in FIG. 3).

There has been described the case of dividing the payload into the first half and the second half. The payload can be alternatively divided into three or more portions. In such a case, the types of headers are increased so as to correspond to the increasing number of arrangement combination patterns.

The number of symbols in the header and the value of the header mentioned above are merely examples. It is possible to use a header of a different value and a different number of symbols as long as there are prepared a plurality of types of headers having different average signal levels of symbols forming the headers and each of the headers absolutely includes signal transition. It is also possible to add the types of headers in order to distinguish data of a different type such as a control signal.

As having been described, in the present embodiment, it is possible to switch the arrangement patterns of data on multiple signal levels in units smaller than those of the third embodiment, so as to effectively cancel deviation in signal level even in a case of including a long code word.

5-2. Receiver

5-2-1. Configuration and Operation

The receiver according to the present embodiment can be configured and operate similarly to the receiver 300R according to the third embodiment, except for part of the operation. The receiver according to the present embodiment is different from the receiver 300R in that a multilevel data inverter therein switches a method of inverse conversion for each of the divided portions of the payload on the basis of the information on arrangement patterns applied to each of the divided portions of the payload indicated by the header bit.

The receiver according to the present embodiment is capable of replacing the arrangement patterns of data on multiple signal levels in units smaller than those of the third embodiment so as to control deviation in signal level more elaborately. The receiver according to the present embodiment is thus capable of effectively cancelling deviation in signal level even in a case of including a long code word, so as to reliably and correctly generating, in comparison to the conventional case, reception data on the basis of a signal transmitted from the transmitter in accordance with a multilevel amplitude modulation scheme.

5-3. Transmission System

5-3-1. Configuration and Operation

The transmission system according to the present embodiment includes the transmitter and the receiver of the present embodiment. The transmission system according to the present embodiment is not described in this section because the transmission system operates similarly to the transmission systems according to the other embodiments.

The modulation unit (multilevel amplitude modulation device) according to each of the embodiments described above can preliminarily prepare a plurality of different candidates for a code word building method. In this case, the plurality of candidates for a code word building method can include candidates for generating headers having average signal levels different from one another and an identical payload upon converting identical data into a code word.

In such a configuration, a receiving device does not need to analyze the header to identify the code word building method.

The modulation unit (multilevel amplitude modulation device) according to each of the embodiments described above can preliminarily prepare a plurality of different candidates for a code word building method. In this case, the plurality of candidates for a code word building method can include methods that apply different arrangement patterns of data values on multiple signal levels. In such a case, the signal converter of the modulation unit generates a header that including information on the selected code word building method.

The modulation unit (multilevel amplitude modulation device) according to each of the embodiments described above can preliminarily prepare a plurality of different candidates for a code word building method. In this case, the plurality of candidates for a code word building method can include methods that apply different arrangement patterns, on multiple signal levels, of data values stored in a plurality of divided portions of a payload of a code word.

The modulation unit (multilevel amplitude modulation device) according to each of the embodiments described above can preliminarily prepare a plurality of different candidates for a code word building method. In this case, the plurality of candidates for a code word building method can include methods that apply arrangement patterns symmetrical with each other with respect to the voltage center.

The modulation unit (multilevel amplitude modulation device) according to each of the embodiments described above can preliminarily prepare a plurality of different candidates for a code word building method. In this case, the plurality of candidates for a code word building method can include methods that apply arrangement patterns in which values of the uppermost bits in data values being inverted with each other.

The average level calculator in the modulation unit (multilevel amplitude modulation device) according to each of the embodiments described above can select one of the plurality of candidates for a code word building method such that an average signal level of a symbol array, obtained by adding a symbol for a code word of digital data to be transmitted to a predetermined number of most recent symbols having been outputted, is most approximate to the voltage center.

The average level calculator in the modulation unit (multilevel amplitude modulation device) according to each of the embodiments described above can select one of the plurality of candidates for a code word building method such that an average signal level of a symbol array, obtained by adding a symbol for a code word of digital data to be transmitted to all symbols having been outputted from the start of output, is most approximate to the voltage center.

The average level calculator in the modulation unit (multilevel amplitude modulation device) according to each of the embodiments described above can select one of the plurality of candidates for a code word building method such that a predetermined number of most recent symbols having been outputted from among symbols having been outputted are most approximate to the voltage center. In this case, the predetermined number can be larger than the number of symbols transmitted from the transmitter in a period corresponding to a reciprocal of the lower cutoff frequency of the transmission line used for transmitting a multilevel amplitude modulation signal.

The function of each of the average level calculators 112 and 312 in the modulation unit (multilevel amplitude modulation device) according to corresponding one of the embodiments described above can be realized by a universal processor for executing a program stored in a memory, for example, though not being limited thereto. This function can be alternatively realized by a dedicated processor, for example.

The function of each of the signal converters 114, 2114, and 3114 in the modulation unit (multilevel amplitude modulation device) according to corresponding one of the embodiments described above can be realized by a universal processor for executing a program stored in a memory, for example, though not being limited thereto. This function can be alternatively realized by a dedicated processor, for example.

The function of each of the multilevel modulators 117, 217, and 317 in the modulation unit (multilevel amplitude modulation device) according to corresponding one of the embodiments described above can be realized by a universal processor for executing a program stored in a memory, for example, though not being limited thereto. This function can be alternatively realized by a dedicated processor, for example.

The function of each of the synchronizers 153 and 353 in the demodulation unit (multilevel amplitude demodulation device) according to corresponding one of the embodiments described above can be realized by a universal processor for executing a program stored in a memory, for example, though not being limited thereto. This function can be alternatively realized by a dedicated processor, for example.

The function of each of the signal inverters 152 and 352 in the demodulation unit (multilevel amplitude demodulation device) according to corresponding one of the embodiments described above can be realized by a universal processor for executing a program stored in a memory, for example, though not being limited thereto. This function can be alternatively realized by a dedicated processor, for example.

What is claimed is:

1. A multilevel amplitude modulation device for generating, from digital data, a multilevel amplitude modulation signal having four or more signal levels and outputting the generated signal, the modulation device comprising:
    an average level calculator operable to select one of a plurality of preliminarily prepared different candidates for a code word building method such that an average signal level of a symbol array, obtained by adding a symbol for a code word of digital data to be transmitted to one or more already outputted symbols included in a multilevel amplitude modulation signal already outputted, is most approximate to voltage center of the four or more signal levels, and output a selection signal indicating the selected code word building method;
    a signal converter operable to form a code word of the digital data in accordance with the code word building method indicated by the selection signal; and
    a multilevel modulator operable to generate a multilevel amplitude modulation signal with use of the code word and output the generated multilevel amplitude modulation signal.

2. The multilevel amplitude modulation device according to claim 1, wherein the plurality of preliminarily prepared different candidates for a code word building method include a plurality of candidates for a code word building method for generating headers having average signal levels different from one another and an identical payload when identical data is converted into a code word.

3. The multilevel amplitude modulation device according to claim 1, wherein the plurality of preliminarily prepared different candidates for a code word building method include a plurality of code word building methods for applying different arrangement patterns of data values on multiple signal levels, and
    the signal converter generates a header including information on the selected code word building method.

4. The multilevel amplitude modulation device according to claim 3, wherein the plurality of preliminarily prepared different candidates for a code word building method include a code word building method for applying different arrangement patterns on multiple signal levels to data values stored in a plurality of divided portions of a payload in the code word.

5. The multilevel amplitude modulation device according to claim 3, wherein the plurality of preliminarily prepared different candidates for a code word building method include a plurality of code word building methods for applying the arrangement patterns symmetrical with each other with respect to the voltage center.

6. The multilevel amplitude modulation device according to claim 3, wherein the plurality of preliminarily prepared different candidates for a code word building method include a plurality of code word building methods for applying the arrangement patterns inverted with each other with respect to values of uppermost bits of the data values.

7. The multilevel amplitude modulation device according to claim 1, wherein the average level calculator selects one of the plurality of candidates for a code word building method such that the average signal level of the symbol array, obtained by adding the symbol for the code word of digital data to be transmitted to a predetermined number of most recent symbols already outputted, is most approximate to the voltage center.

8. The multilevel amplitude modulation device according to claim 1, wherein the average level calculator selects one of the plurality of candidates for a code word building method such that the average signal level of the symbol array, obtained by adding the symbol for the code word of digital data to be transmitted to all of already outputted symbols from start of output, is most approximate to the voltage center.

9. A transmission system comprising:
    a transmitter including the multilevel amplitude modulation device according to claim 1; and
    a receiver including a multilevel amplitude demodulation device for demodulating a multilevel amplitude modulation signal having four or more signal levels and outputting digital data,
    wherein the demodulation device includes:
        a synchronizer operable to demodulate the multilevel amplitude modulation signal and detect a header of a code word;
        a signal inverter operable to identify a code word building method employed to form the code word based on a value of the header detected by the synchronizer and execute inverse conversion corresponding to the code word building method to generate and output digital data.

10. The transmission system according to claim 9, wherein the average level calculator of the multilevel amplitude modulation device of the transmitter selects one of the plurality of candidates for a code word building method such that the average signal level of the symbol array, obtained by adding the symbol for the code word of digital data to be transmitted to a predetermined number of most recent symbols already outputted, is most approximate to the voltage center, and
    the predetermined number is larger than the number of symbols transmitted from the transmitter in a period corresponding to a reciprocal of a lower cutoff frequency of a transmission line used for transmitting the multilevel amplitude modulation signal.

11. A multilevel amplitude modulation method executed by a modulation device, of generating, from digital data, a multilevel amplitude modulation signal having four or more signal levels and outputting the generated signal, the method comprising:

receiving digital data to be transmitted;

selecting one of a plurality of preliminarily prepared different candidates for a code word building method such that an average signal level of a symbol array, obtained by adding a symbol for a code word of the digital data to one or more already outputted symbols included in a multilevel amplitude modulation signal already outputted, is most approximate to voltage center of the four or more signal levels, and generating a multilevel amplitude modulation signal with use of the code word of the data formed in accordance with the code word building method thus selected, and outputting the generated signal.

* * * * *